(12) United States Patent
Jacobs

(10) Patent No.: US 9,632,530 B2
(45) Date of Patent: Apr. 25, 2017

(54) DISPLAY PANEL RESPONSIVE KEY RETRACTION

(71) Applicant: HEWLETT-PACKARD DEVELOPMENT COMPANY, L.P., Houston, TX (US)

(72) Inventor: Steven K Jacobs, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/893,947

(22) PCT Filed: Aug. 26, 2013

(86) PCT No.: PCT/US2013/056686
§ 371 (c)(1),
(2) Date: Nov. 25, 2015

(87) PCT Pub. No.: WO2015/030713
PCT Pub. Date: Mar. 5, 2015

(65) Prior Publication Data
US 2016/0161987 A1 Jun. 9, 2016

(51) Int. Cl.
*G06F 1/16* (2006.01)
(52) U.S. Cl.
CPC .......... *G06F 1/1616* (2013.01); *G06F 1/1637* (2013.01); *G06F 1/1662* (2013.01); *G06F 1/1666* (2013.01); *G06F 1/1681* (2013.01)
(58) Field of Classification Search
CPC .... G06F 1/1616; G06F 1/1637; G06F 1/1662; G06F 1/1666; G06F 1/1632; G06F 3/0202; G06F 1/626; G06F 1/1684; G06F 1/1671; G06F 1/1681; G06F 1/187; H03K 17/9622; H03K 2217/960755; H03K 17/972; H03K 17/98
USPC ............ 361/679.27, 679.08, 679.09, 679.21, 361/679.01, 679.02, 679.26
See application file for complete search history.

(56) References Cited

U.S. PATENT DOCUMENTS

| | | | |
|---|---|---|---|
| 5,635,928 A | 6/1997 | Takagi et al. | |
| 5,790,370 A | 8/1998 | Merkel | |
| 8,102,647 B2 | 1/2012 | Bhutani et al. | |

FOREIGN PATENT DOCUMENTS

| | | |
|---|---|---|
| EP | 0691601 | 1/2001 |
| JP | 05-080878 | 4/1993 |
| JP | 11-259208 | 9/1999 |
| KR | 10-2002-0072669 | 9/2002 |

*Primary Examiner* — Anthony Haughton
*Assistant Examiner* — Ingrid Wright
(74) *Attorney, Agent, or Firm* — HP Patent Department

(57) ABSTRACT

A deck supports depressable keys. The keys can be resiliently biased to a raised state. A display panel can be pivotally coupled to the deck for movement between a deployed position and a closed position. A retraction mechanism comprises a retraction frame and a retraction drive. The retraction frame is translatable between a releasing position along the depressable keys to actuate the depressable keys to the raised state and a retracting position moving to move the depressable keys to the retracted state. The retraction drive translates the retraction frame towards the retracting position in response to pivoting of the display panel towards the closed position.

15 Claims, 19 Drawing Sheets

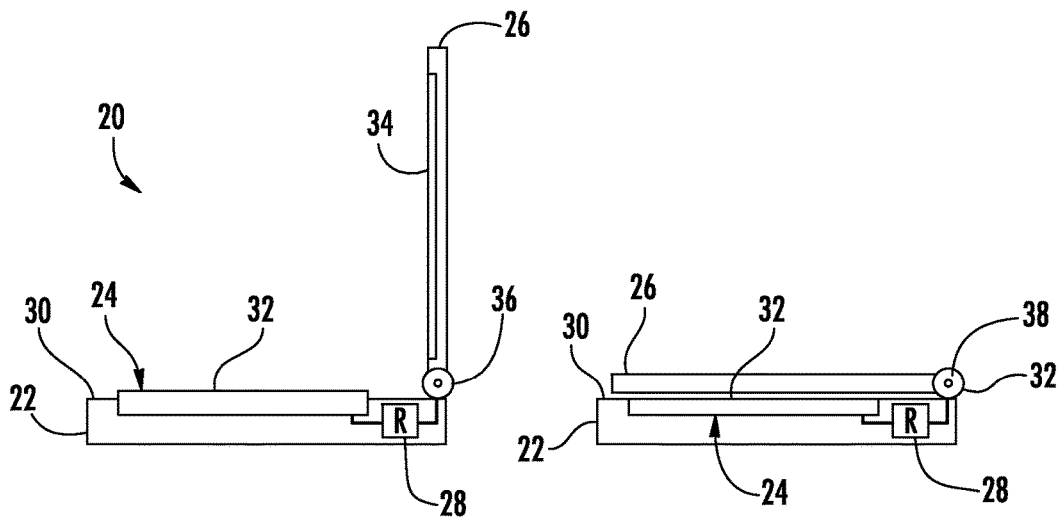
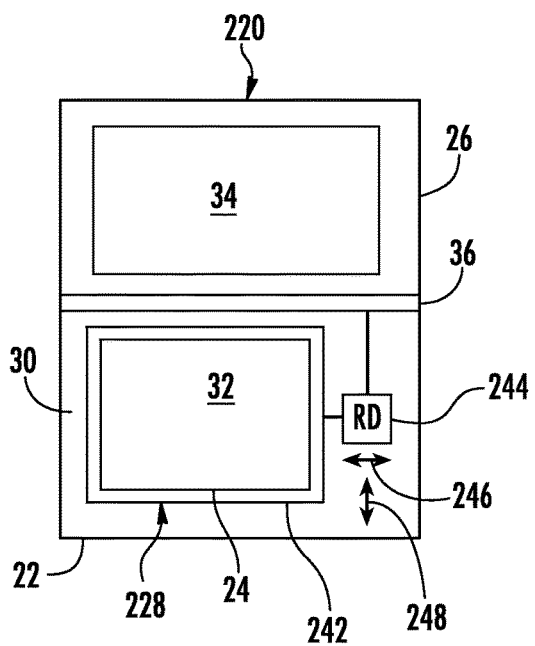
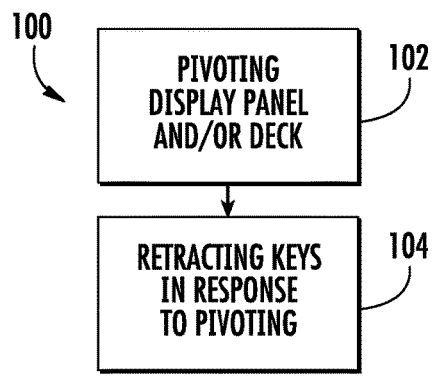
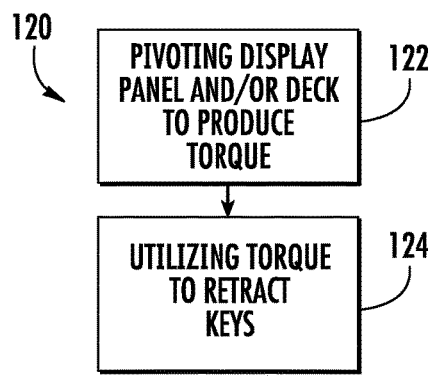

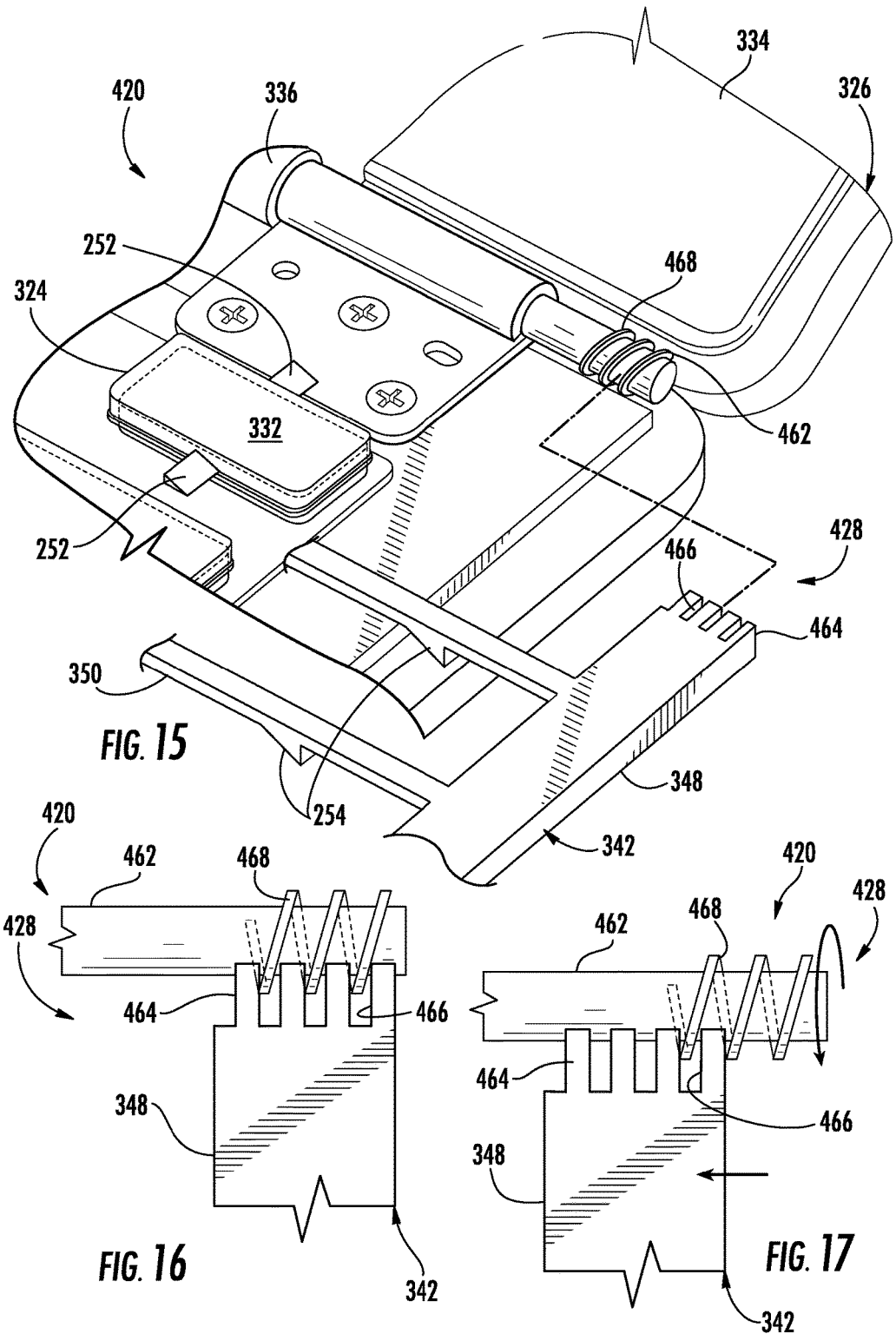

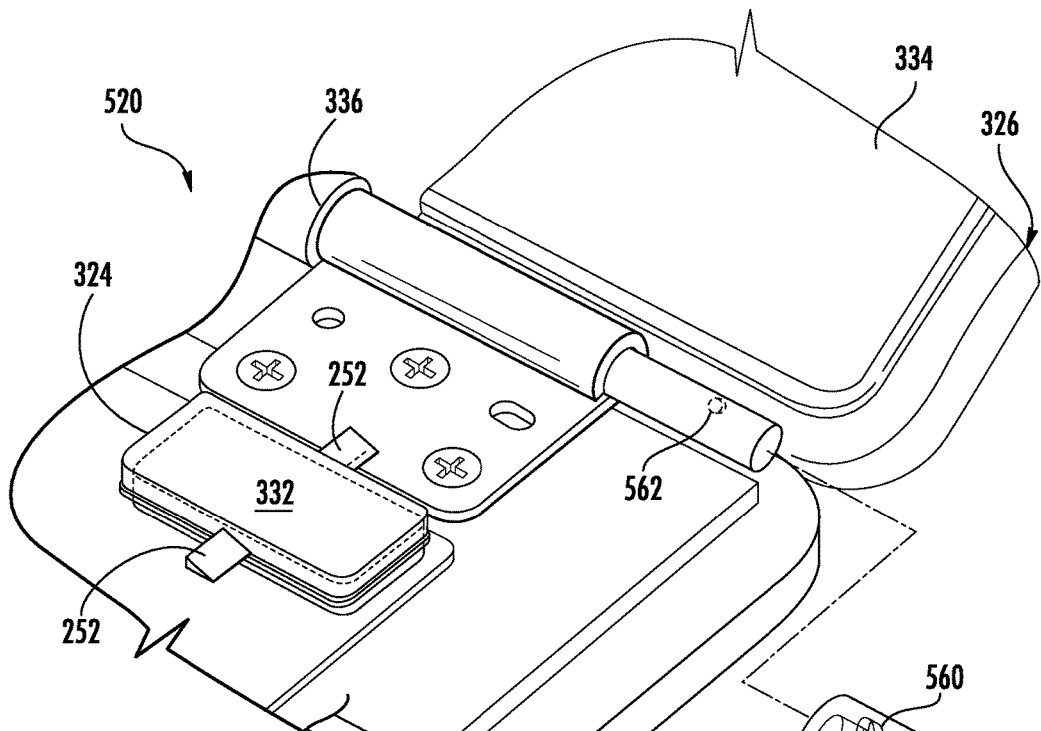
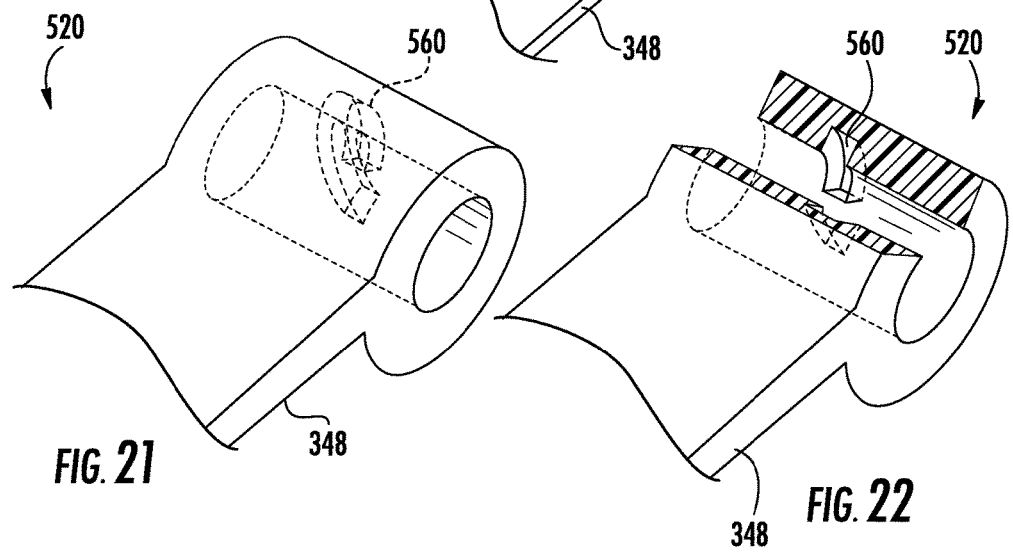
FIG. 20
FIG. 21
FIG. 22

DISPLAY PANEL RESPONSIVE KEY RETRACTION

BACKGROUND

Electronic devices are sometimes equipped with depressable keys to facilitate the input of information, selections or commands. Such depressable keys remain proud of the underlying deck as the keys are depressed through a depressment distance. This depressment distance of the depressable keys contributes to the thickness of the electronic device. The distance in which the keys are depressed provides tactile feedback to a user.

BRIEF DESCRIPTION OF THE DRAWINGS

FIG. 1 is a side view of an example electronic device with a display panel in a deployed position.

FIG. 2 is a side view of the electronic device of FIG. 1 with the display panel in a closed position.

FIG. 3 is a flow diagram of an example method that may be carried out by the electronic device of FIG. 1.

FIG. 4 is a flow diagram of another example method that may be carried out by the electronic device of FIG. 1.

FIG. 5 is a front view of another example electronic device with a display panel in a deployed position.

FIG. 15 is a fragmentary exploded perspective view of another example of the electronic device of FIG. 9.

FIG. 16 is a fragmentary top view of the electronic device of FIG. 15 illustrating portions of a retraction drive with a retraction frame in a releasing position.

FIG. 17 is a fragmentary top view of the electronic device of FIG. 15 illustrating portions of the retraction drive with the retraction frame in a retracting position.

FIG. 20 is a fragmentary exploded perspective view of another example of the electronic device of FIG. 9.

FIG. 21 is a fragmentary perspective view of a cam follower of a retraction drive of the electronic device of FIG. 20.

FIG. 22 is a sectional view of the cam follower of FIG. 21.

DETAILED DESCRIPTION OF THE EXAMPLE EMBODIMENTS

Figure 6:
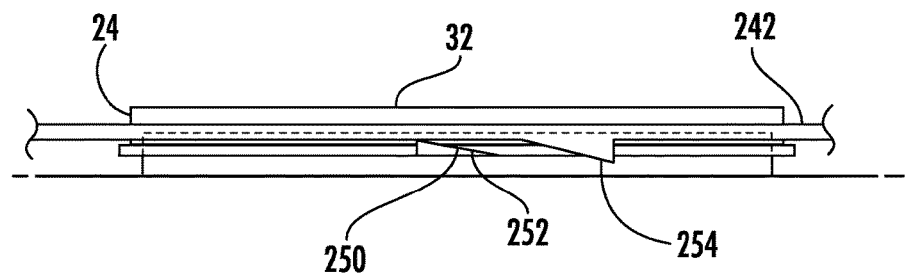
FIGS. 6-8 are side views of an example electronic device during movement of keys to a retracted state.

FIG. 1 schematically illustrates an example electronic device 20 in an open or deployed state. As will be described hereafter, electronic device has depressable keys which are automatically retracted as a display panel of the electronic device 20 is being closed to reduce a thickness of the electronic device. Electronic device 20 comprises deck 22, keys 24, display panel 26 and retraction mechanism 28.

Deck 22 comprises a base structure housing electronic components of device 20 and supporting keys 24. In some implementations, deck 22 may support additional input devices as well such as touchpads, switches, slider bars and the like. Deck 22 may have a variety of different sizes, shapes and configurations depending upon the use of electronic device 20. Deck 22 comprises an upwardly facing surface 30 above which keys 24 proudly rise when display panel 26 is opened or raised.

Keys 24 comprise an arrangement of one or more manually depressable protuberances or projections to facilitate the input of information, selections or commands to electronic device 20. Each of the individual keys 24 is movable between against a resilient bias from a raised state in which an uppermost surface 32 of keys 24 proudly projects above surface 30 to a depressed state. In one implementation, each individual key 24 is resiliently biased towards the raised state by an underlying elastic or rubber-like dome. In other implementations, each individual key may be resiliently biased towards the raised state by other mechanisms such as magnets, springs or other mechanisms.

In the depressed state, the uppermost surface of the individual key 24 projects or rises above surface 30 of deck 22. In another implementation, in the depressed state, the uppermost surface 32 of the individual key 24 is depressed to a height below the top surface 30 of deck 22. Movement of the individual key 24 to the depressed state triggers the transmission of a signal to a processing unit indicating the selection of the individual key 24. When the individual key is manually released, the individual key resiliently returns to the raised state.

In one example implementation, keys 24 comprise a keyboard including depressable keys representing alphanumeric symbols. In another implementation, keys 24 may be part of a keyboard or keypad having a plurality of keys having other types of keys, other numbers of keys and other layouts of keys. In one implementation, keys 24 are provided part of a laptop or notebook computing device. In yet another implementation, keys 24 are provided as part of a portable phone such as a cell phone or smart phone. In yet other implementations, keys 24 are provided as part of other electronic devices having a deck supporting a display panel that moves between an open or deployed position and a covering or closed position.

Display panel 26 comprises a panel supporting a display screen 34. Display panel 26 is pivotally coupled to deck 22 for movement between an open or deployed position shown in FIG. 1 and a covering or closed position as shown in FIG. 2. In the example illustrated display panel 26 comprises portions of a hinge 36 which facilitate pivoting of display panel 26 relative to deck 22. In other implementations, display panel 26 may be pivotably coupled to deck 22 by other pivot mechanisms.

For purposes of this disclosure, the term "coupled" shall mean the joining of two members directly or indirectly to one another. Such joining may be stationary in nature or movable in nature. Such may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

Retraction mechanism 28 comprises an arrangement of components coupled to display panel 26 and coupled to keys 24 to move the keys 24 towards a retracted state in response to pivoting of the display panel 26 towards the closed position shown in FIG. 2. In the example illustrated in FIG. 2, movement of display panel 26 towards the closed position results in keys 24 being automatically moved towards the retracted state prior to the display panel contacting the keys 24. In the retracted state, the uppermost surface of each of keys 24 lies at or below the uppermost surface 30 of deck 22. Although FIG. 2 illustrates the uppermost surface 32 of keys 24 at or in the same plane as surface 30 when keys 24 are in the retracted state, in other implementations, the uppermost surface 32 of keys 24 may be below (towards the bottom surface of deck 22) the uppermost surface 30 when keys 24 are in the retracted state.

In one implementation, the height or positioning of surface 32 of keys 24 in the retracted state coincides with the height or positioning of surface 32 of keys 24 in the depressed position. In another implementation, the height or positioning of surface 32 of keys 24 in the retracted state does not coincide with the height or positioning of surface 32 of keys 24 in the depressed position. For example, in one implementation, the triggering of an electronic signal may occur in response to the top surface 32 an individual key 24 being depressed to a first height yet above surface 30 of deck 22, wherein the top surface 32 of the same individual key is at a second height, below surface 30 of deck 22, when keys 24 are in the retracted state.

FIG. 3 is a flow diagram of an example method 100 carried out by electronic device 20 as shown in FIGS. 1 and 2. As indicated by step 102, display panel 26 and/or deck 22 is pivoted from and at least partially open state shown in FIG. 1 towards and to the closed position shown in FIG. 2. In the example illustrated, such pivoting is manually performed by a person applying force to one or both of deck 22 and display panel 26 to pivot display panel 26 and deck 22 relative to one another about axis 36. In one implementation, the display screen 34 of display panel 26 faces keys 24 when in the closed position shown in FIG. 2. In another implementation, the display screen 34 may additionally be rotatable such that display screen 34 may face away from keys 24 in an upward direction or forward direction when display panel 26 is in the closed position shown in FIG. 2.

As indicated by step 104, in response to pivoting of display panel 26 towards the closed position, keys 24 are moved from the proud or raised state shown in FIG. 1 towards the retracted state shown in FIG. 2. In one implementation, pivoting of display panel 26 results in actuation of an electronic switch or trigger that it causes an electrically powered actuator to initiate powered movement of keys 24. For example, pivoting of display panel 26 may result in a switch being pressed which turns on or actuates a solenoid or other electrically power device provided as part of retraction mechanism 28 to drive keys 32 to the retracted state. In another implementation, pivoting of display panel 26 creates torque which is transmitted to keys 24 to move keys 24. In yet another implementation, pivoting of display panel 26 repositions magnets relative to one another such that attractive or repulsive magnetic forces are transmitted so as to move keys 24.

In one implementation, movement of keys 24 from the raised state shown in FIG. 1 towards the retracted state shown in FIG. 2 occurs immediately in response to pivoting of display panel 26 towards the closed position. In one implementation, retraction mechanism 20 is configured such that movement of keys 24 towards the retracted state is proportionally constant relative to pivoting of display panel 26 towards the closed position. In another implementation, retraction mechanism 28 is configured such that mover cut of keys 24 towards the retracted state occurs at different rates relative to the pivoting of display panel 26 towards a closed position based upon the angular positioning of display panel 26 with respect to deck 22. In one implementation, retraction mechanism 28 is configured to provide a dwell such that initial pivoting of display panel 26 towards the closed position does not result in any movement of keys 24 towards the retracted state or such that movement of the keys towards the retracted state is delayed until the display panel 26 has been pivoted to a predetermined angular position with respect to the deck 22. In one implementation, movement of keys 24 towards the retracted state is delayed until display panel 26 is angularly spaced from deck 22 by an angle of less than 45 degrees and nominally 30 degrees. For example, at an angular extent of 45 degrees from deck 22, retraction mechanism 28 begins retracting keys 24. As display panel 26 is continued to be lowered towards deck 22, retraction keys 24 continues until keys 24 have been moved to the retracted state. By automatically moving keys 24 to the retracted state during in response to closing of display panel 26, the height or thickness of electronic device 20, when closed, is reduced.

FIG. 4 is a flow diagram of method 120, an example implementation of method 100 that may be carried out by electronic device 20 shown in FIGS. 1 and 2. As indicated by step 122, display panel 26 and/or deck 22 are pivoted to produce torque. As indicated by step 124, the produced or generated torque or force is then utilized to retract keys 24 against the upward resilient bias of keys 24. In one implementation, the generated torque is utilized to pivot or translate one or more mechanical camming arrangements, linkages, gears, cables, universal joints or the like such that the force is transmitted to keys 24 to urge the keys 24 towards the retracted state. As noted above with respect to step 104, in such an implementation, retraction mechanism 28 is configured to transmit the torque or force to keys 24 such that keys 24 move towards the retracted state in a proportionally constant rate or varying rate relative to the pivoting of display panel 26. In other implementations, retraction mechanism 28 is configured to transmit the torque or force to keys 24 such that keys 24 experience a dwell, moving towards the retracted state after display panel 26 is within a predetermined angle with respect to or from deck 22.

FIG. 5 schematically illustrates electronic device 220, an example implementation of electronic device 20. Electronic device 220 is similar to electronic device 20 except that electronic device 220 is specifically illustrated as comprising retraction mechanism 228, in implementation of retraction mechanism 28. Retraction mechanism 228 comprises retraction frame 242 and retraction drive 244. Retraction frame 242 comprises a horizontally translatable or slidable structure that extends across keys 24 so as to interact with each of the individual keys 24 upon translation or sliding of frame 242. In one implementation, retraction frame 242 extends transversely and horizontally (from the left side to the right side of deck 22 when facing display screen 34 in a deployed position) and is horizontally translatable or slidable by retraction drive 244 in the direction indicated by arrows 246 across keys 24 in the gaps or spaces between the rows of individual keys 24. As a result, frame 242 utilizes the extra space resulting from transversely wider display screens. In another implementation, retraction frame 242 extends longitudinally or fore and aft (from the frontage to the rear edge of deck 22 towards display panel 26) and is horizontally translatable or slidable by retraction drive 244 in the direction indicated by arrows 248 across keys 24 in gaps or spaces between the columns of individual keys 24. Although illustrated as extending completely about the collective arrangement of keys 24, in other implementations, frame 24 may alternatively extend along less than all of the sides of the collective area containing keys 24. In other implementations where the collection of keys 24 are themselves supported by a platform which is resiliently biased to a raised state, frame 24 may alternatively engage or interact with the platform to drive the platform along with the collection of supported keys to the retracted state.

Retraction frame 242 is horizontally translatable or slidable between a releasing position along the keys 24 and a retracting position. In the releasing position, retraction frame 242 is positioned relative to the keys such that the keys are allowed to be resiliently biased to the raised state extending above surface 30 of deck 22. In the retracting position, retraction frame 242 is positioned relative to the keys such that retraction frame 242 interacts with the individual keys (or a platform supporting the collection of keys) to drive and maintain the keys in the retracted state.

Figure 7:
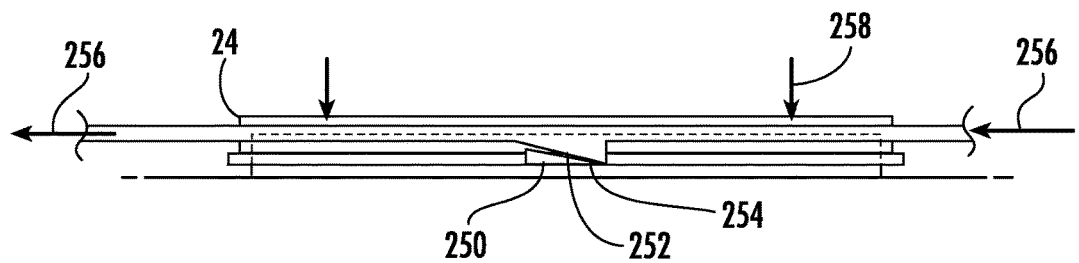
Figure 8:
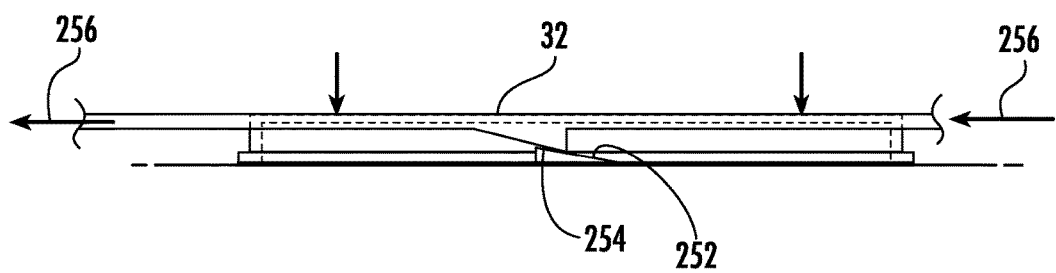

FIGS. 6-8 illustrates one example configuration of retraction mechanism 28 and the interaction between retraction frame 242 and an individual keys 24. FIG. 6 illustrates retraction frame 242 in the releasing position such that the individual keys 24 is allowed to be resiliently biased to the raised state extending above surface 30 (shown in FIG. 5) and above frame 242. As shown by FIG. 6, each individual key 24 comprises a lower rim, ledge or shelf 250 carrying an upwardly facing sloped surface or ramp 252. Frame 242 comprises a corresponding downwardly facing sloped surface or ramp 254. Ramps 252, 254 interact with one another by slidably riding along the sloped surface of the other such that key 24 is either driven in a downward vertical direction (perpendicular to surface 32) or allowed to be resiliently biased in a vertical upward direction towards a state. Although both key 24 and frame 242 are illustrated as including ramps 252, 254, respectively, in other implementations, one of such ramps 252, 254 may be omitted and replaced by an alternative structure serving as a ramp rider such as a pin, tab or other projection.

FIGS. 7 and 8 illustrate horizontal translation of frame 242 relative to the individual key 24 so as to drive the individual key 24 against its resilient bias towards and to the retracted state. As shown by FIG. 7, translation of frame 242 in the direction indicated by arrows 256 towards the retracting position causes ramp 242 rider slide along ramp 252 which drives key 24 downward in the direction indicated arrows 258. As shown by FIG. 8, ramps 252, 254 are configured such that the individual key 24 is driven downward to a fully retracted position in which top surface 32 of the individual key 24 is at or below surface 30 of deck 22 and/or the upper surface of frame 242. In one implementation, ramps 252, 254 are configured to provide a dwell such that initial movement of frame 242 in response to initial rotation of display panel 326 occurs while ramps 252, 254 are not in ramp riding engagement with one another. In one implementation, ramps 252, 254 are located and configured so as to not engage one another until display panel 326 has been pivoted to within a predetermined angular spacing from deck 22. In one implementation, ramps 252, 254 do not engage one another to begin retracting keys 24 until display panel 326 has been pivoted towards the closed position and within less than or equal to 45 degrees and at 30 degrees from deck 22.

Horizontal translation of frame 242 in the direction opposite to that indicated by arrows 256 permits the individual key 24 to be resiliently returned to the raised state shown in FIG. 6. In one implementation, frame 242 is moved back to the releasing position using force applied by retraction drive 244. In another implementation, the force applied to frame 242 in the direction indicated by arrow 256 by retraction drive 244 is terminated or removed, wherein as the individual key 24 resiliently returns to the raised a shown in FIG. 6, ramp 252 rides against ramp 254 under the force of the individual key 24 to urge frame 242 back to the right (as seen in FIGS. 6-8) to the default retracting position.

Retraction drive 244 comprises a mechanism operably coupled to retraction frame 242 to horizontally translate or slide retraction frame 242 between the releasing position and the retracting position. In one implementation, retraction drive 244 comprises an electrically powered actuator, such as electric solenoid, as hydraulic or pneumatic cylinder-piston assembly, a piezo electric actuator or other electrically powered actuators which move retraction frame 242 based upon the angular positioning of display panel 26. In another implementation, retraction drive 244 comprises a mechanism operably coupled between and mechanically linking display panel 26 to retraction frame 242. As noted above with respect to method 120 in FIG. 4, display panel 26 and/or deck 22 may be pivoted relative to one another to produce torque, wherein the force or torque is transmitted through one or more linkages, gears, direction changing cam and cam follower arrangements and the like to retraction frame 242 to horizontally or diagonally translate retraction frame 242 between the releasing position and the retracting position described with respect to FIGS. 6-8.

Figure 9:
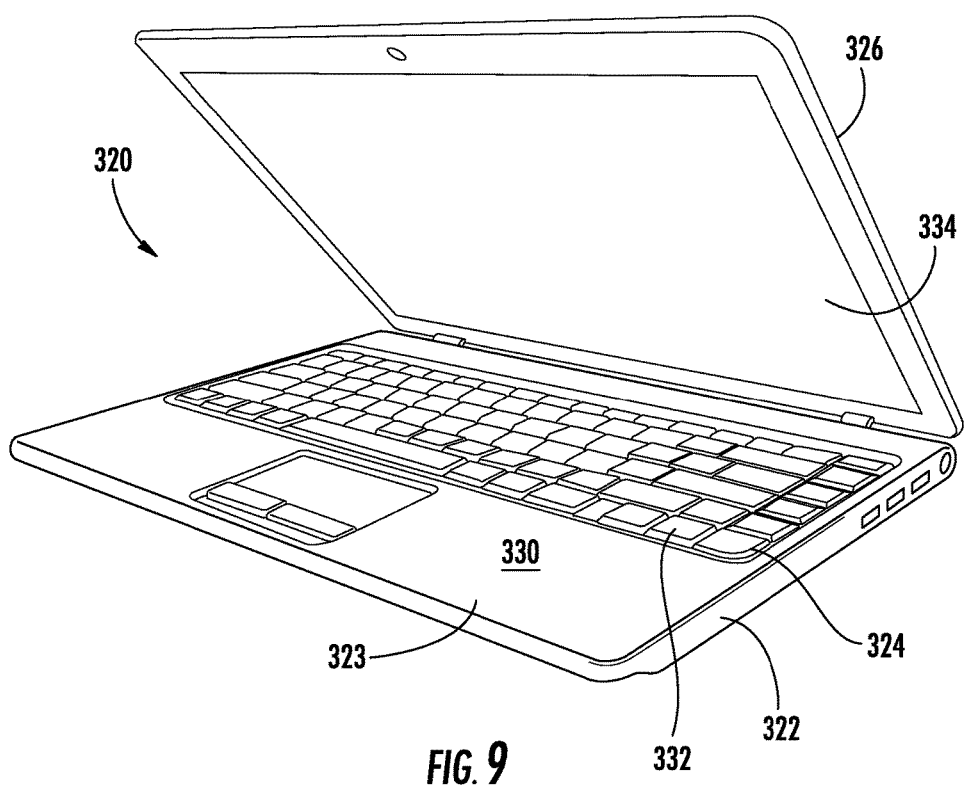
FIG. 9 is a front perspective view of another example of the electronic device of FIG. 5.

FIGS. 9-14 illustrate electronic device 320, an example implementation of electronic device 220. Although shown as being provided as part of an electronic device comprising a laptop computer, the features described with respect to electronic device 320 may similarly be provided in other electronic devices having pivoting display panels. As shown by FIG. 9, electronic device 320 comprises deck 322, keys 324, display panel 326 and retraction mechanism 328 (shown in FIG. 10).

Deck 322 comprises a base structure housing electronic components of device 320 and supporting keys 324. In some implementations, deck 322 may support additional input devices as well such as touchpads, switches, slider bars and the like. Deck 322 may have a variety of different sizes, shapes and configurations depending upon the use of electronic device 320. Deck 322 comprises a top panel 323 having an upwardly facing surface 330 above which keys 324 proudly rise when display panel 326 is opened or raised.

Keys 324 comprise an arrangement of one or more manually depressable protuberances or projections to facilitate the input of information, selections or commands to electronic device 320. Each of the individual keys 324 is movable against a resilient bias from a raised state in which an uppermost surface 332 of keys 324 proudly project above surface 330 to a depressed state. In one implementation, each individual key 324 is a resiliently biased towards the raised state by an underlying elastic or rubber-like dome. In other implementations, each individual key may be resiliently biased towards the raised state by other mechanisms such as magnets, springs or other mechanisms.

In the depressed state, the uppermost surface of the individual key 324 projects or rises above surface 330 of deck 322. In another implementation, in the depressed state, the uppermost surface 332 of the individual key 324 is depressed to a height below the top surface 330 of deck 322. Movement of the individual key 324 to the depressed state triggers the transmission of a signal to a processing unit indicating the selection of the individual key 324. When the individual key is manually released, individual key resiliently returns to the raised state.

In the example illustrated, keys 24 comprise a keyboard comprising depressable keys representing alphanumeric symbols. In another implementation, keys 324 may be part of a keyboard or keypad having a plurality of keys having other types of keys, other numbers of keys and other layouts of keys.

Figure 10:
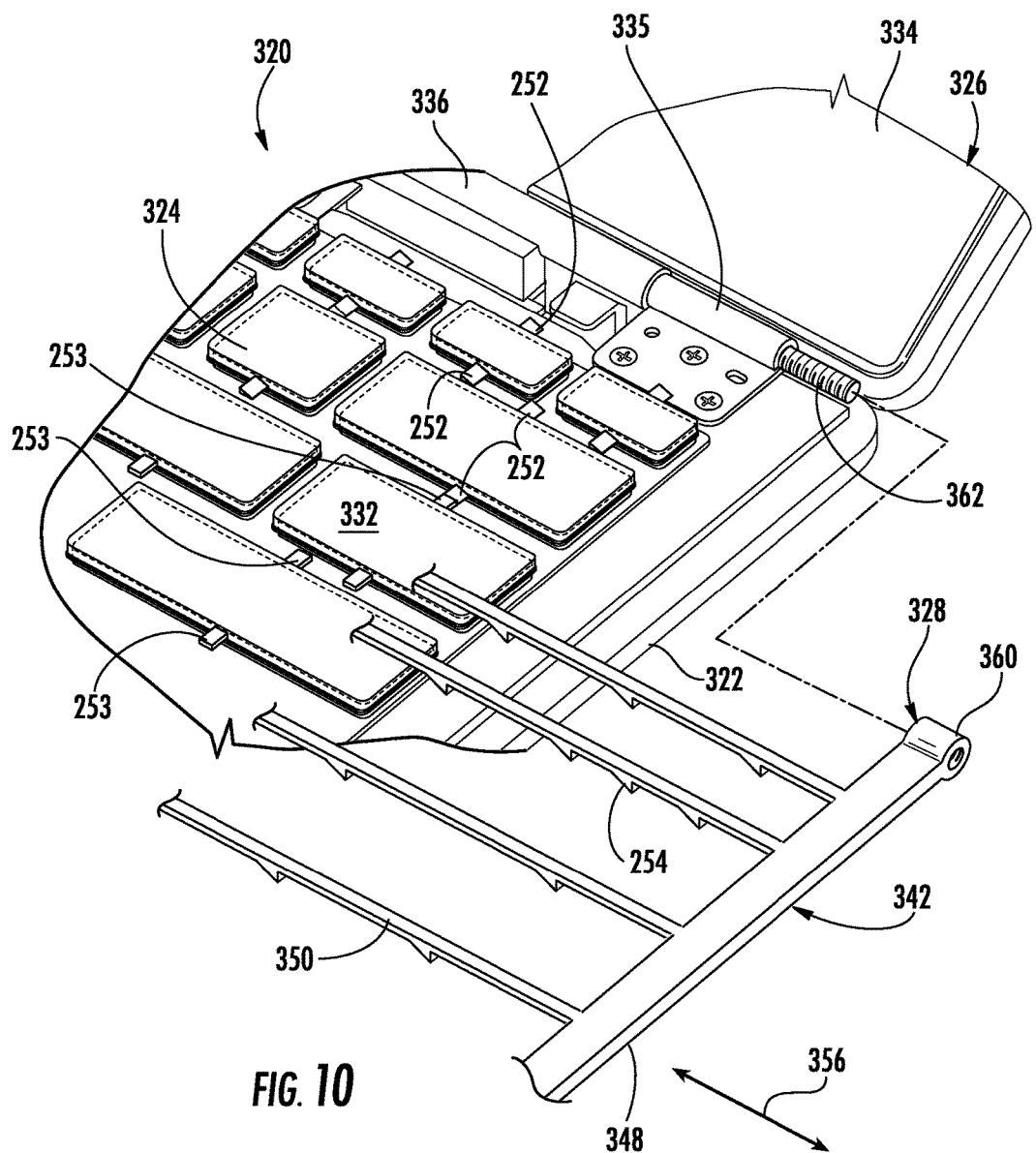
FIG. 10 is a fragmentary exploded perspective view of the electronic device of FIG. 9.
Figure 11:
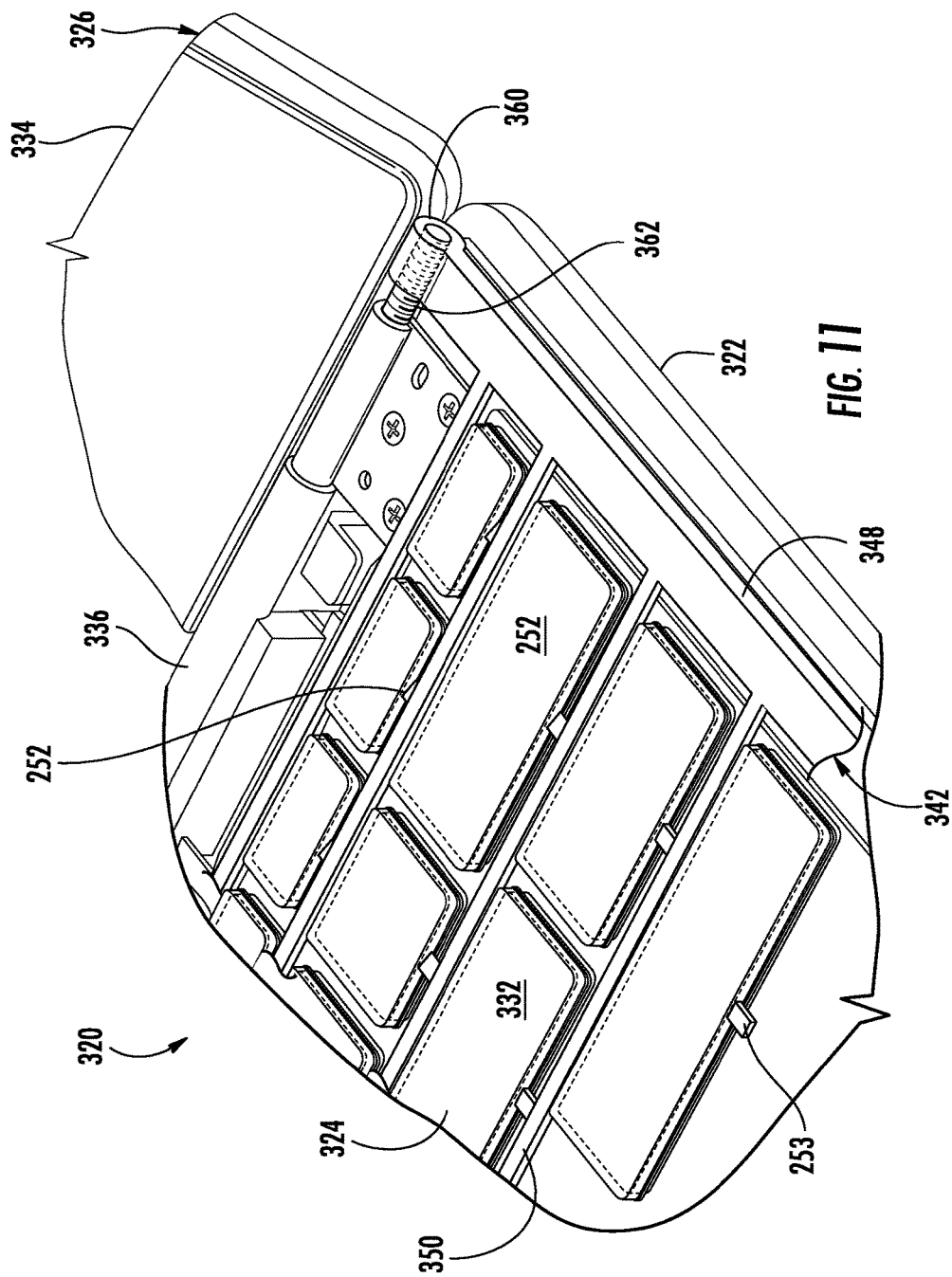
FIG. 11 is a fragmentary perspective view of the computing device of FIG. 9 illustrating keys in a raised state.
Figure 12:
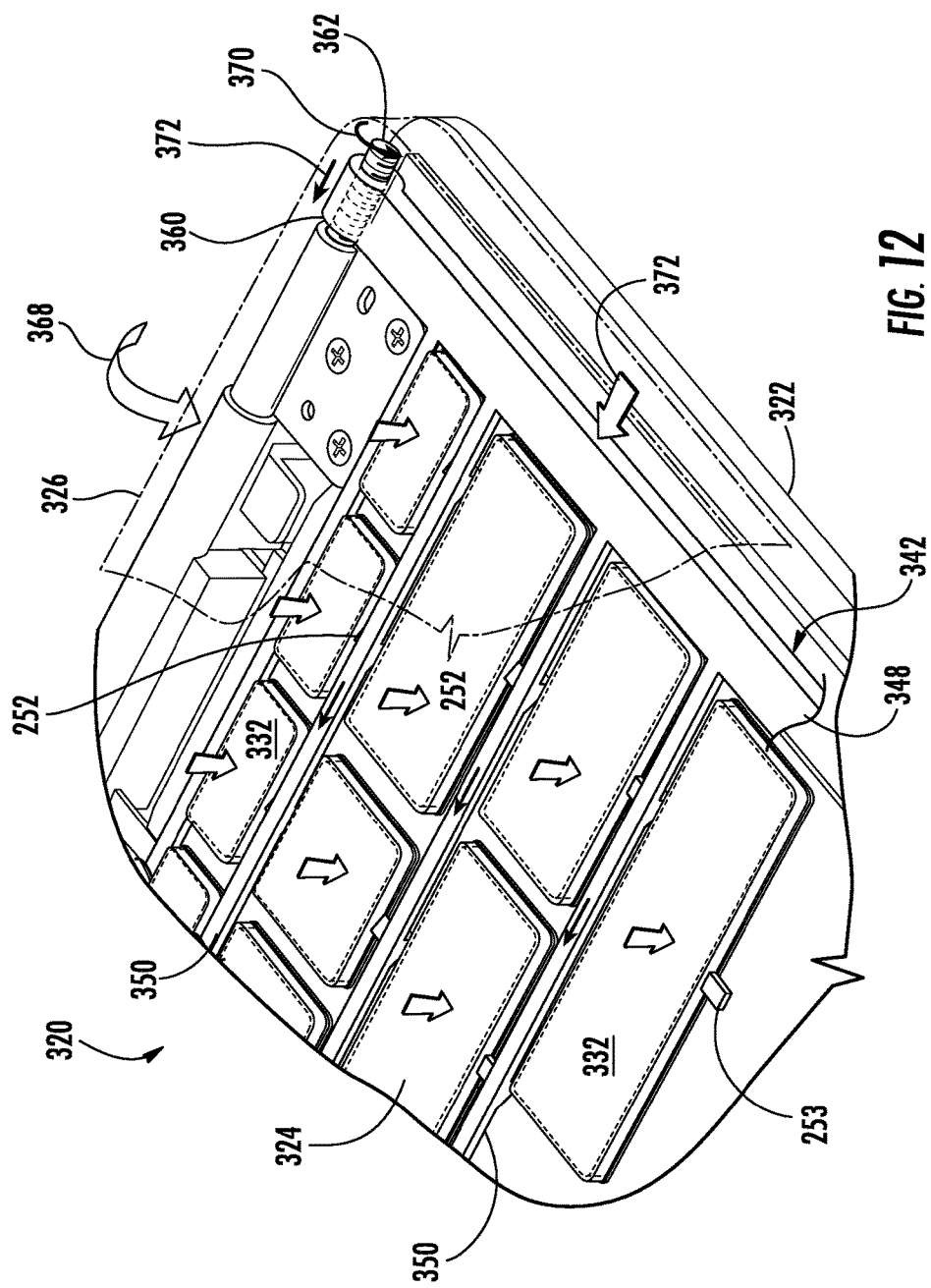
FIG. 12 is a fragmentary perspective view of the computing device of FIG. 9 illustrating movement of the keys to a retracted state in response to pivoting of a display panel of the electronic device.
Figure 13:
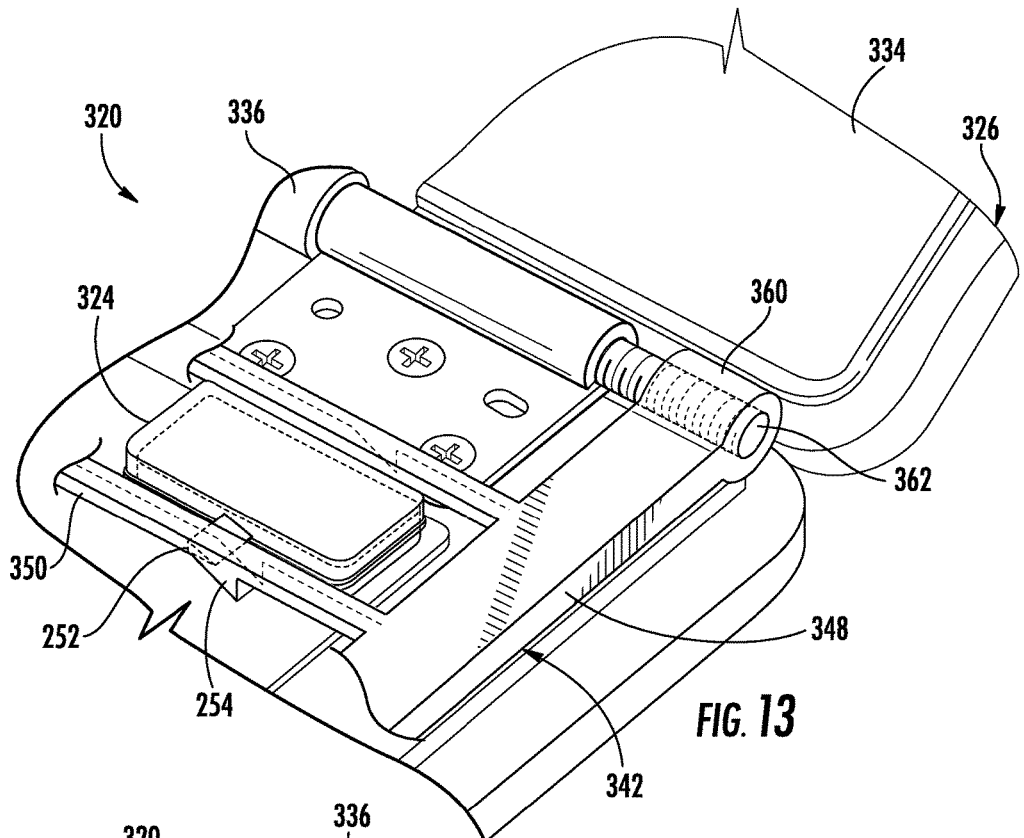
FIG. 13 is an enlarged fragmentary perspective view of the computing device of FIG. 9 with the keys in the raised state.
Figure 14:
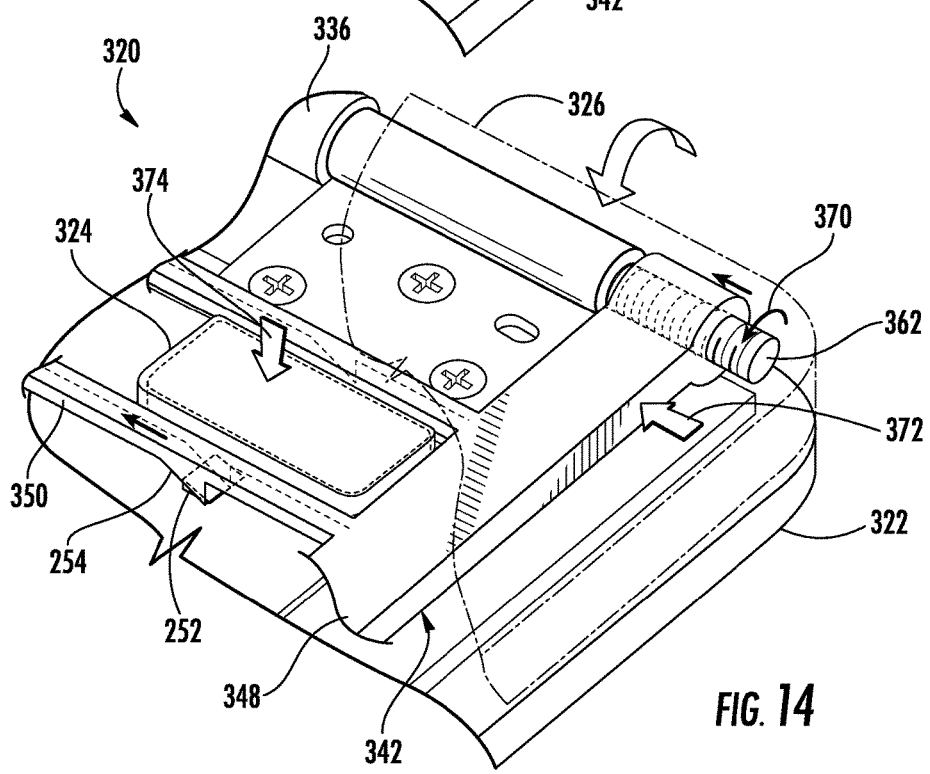
FIG. 14 is an enlarged fragmentary perspective view of the computing device of FIG. 9 with the keys in the retracted state.

Display panel 326 comprises a panel supporting a display screen 334 pivotally coupled to deck 322 for movement between an open or deployed position shown in FIGS. 9, 11 and 13 and a covering or closed position as shown in FIGS. 12 and 14. FIG. 10 illustrates a portion of electronic device 320 with the top panel 323 omitted. As shown by FIG. 10, display panel 326 comprises a hinge shaft 36 extending from the lower edge of display panel 326 and hinged to deck by sleeve 335. In other implementations, display panel 326 may be pivotably coupled to deck 322 by other pivot mechanisms.

FIG. 10 further illustrates keys 324 and retraction mechanism 328 in more detail. In the example shown in FIG. 10, keys 324 are illustrated as including two different examples of ramp riders: ramps 252 (described above) and ramp riding projections 253. Ramp riding projections 253 extend from opposite sides of keys 24, wherein such ramp riding projections 253 comprise tabs, pins or other projections. Like ramps 252, ramp riding projections 253 slide along or ride along the downwardly facing ramps 254 of frame 342 during movement of retraction frame 342. Because ramps 252 and ramp riding projections 253 project from opposite sides of keys 24, downward forces are exerted upon both sides of each key 24 when key 24 is being retracted to facilitate even retraction of each key 24 by frame 342. In other implementations, ramps 252 or ramp riding projections 253 may alternatively extend on a single side of each key 24. In some implementations, keys 24 may include more than one ramp 252 or ramp riding projection 253 on a side.

Retraction mechanism 328 comprises retraction frame 342 and retraction drive 344. Retraction frame 342 comprises a horizontally translatable or slidable structure that extends transversely and horizontally (from the left side to the right side of deck 22 when facing display screen 34 in a deployed position) below panel 323. Retraction frame 342 comprises an end bar 348 and a plurality of legs 350. End bar 348 extends along a side of the collection of keys 324 and joins each of legs 350. Legs 350 extend from end bar 348 across the collection of keys 324 in the gaps or spaces between the rows of keys 324. Each leg 350 carries a downwardly facing ramp 254 corresponding to the upwardly facing and oppositely angled ramps 254 or other ramp riders 255 of each adjacent to the 324. Frame 342 is horizontally translatable or slidable by retraction drive 244 in the direction indicated by arrows 246 across keys 324 in the gaps or spaces between the rows of individual keys 324. In another implementation, retraction frame 242 extends longitudinally or fore and aft (from the frontage to the rear edge of deck 322 towards display panel 326) and is horizontally translatable or slidable by retraction drive 344 in the direction indicated by arrows 356.

Retraction drive 344 comprises a mechanism mechanically and operably coupling hinge shaft 336 of display panel 326 to retraction frame 342 to automatically translate frame 342 in response to or based upon pivoting of display panel 326. In the example illustrated, retraction drive 344 comprises lead nut 360 and lead screw 362. Lead nut 360 comprises an internally threaded member coupled to end bar 348 and fixed against rotation. Lead screw 362 comprises an externally threaded shaft extending from pivot shaft 336 so as to rotate with pivot shaft 336. Lead screw 362 comprises external helical threads that engage the internal threads of lead nut 360 such that upon rotation of lead screw 362 in response to pivoting of display panel 326, end bar 348 is linearly and horizontally translated in the directions indicated by arrow 356. In particular, as display panel 326 is pivoted downward towards the closed position and towards deck 322, frame 342 is driven to the left as seen in FIG. 10.

FIGS. 11-14 illustrate retraction of keys by retraction mechanism 328. FIGS. 11 and 13 illustrate retraction frame 342 in the releasing position while FIGS. 12 and 14 illustrate retraction frame in the retracting position. As shown by FIGS. 11 and 13, when in the releasing position, ramps 254 are out of engagement with ramps 252 of each of the keys 324. As a result, each of the keys 324 is resiliently biased to the raised state in which the top surface 332 of each key to 324 rises above or is located above the top surface 330 of deck 322.

As shown by FIGS. 12 and 14, pivoting of display panel 326 (shown in phantom and partially broken away) to the closed position as indicated by arrow 368 rotates the hinge shaft 336 which also results in rotation of lead screw 362 in the direction indicated by arrow 370. Rotation of lead screw 362 results in lead nut 360 and retraction frame 342 being linearly translated in the direction indicated by arrows 372. As shown by FIG. 14, during such linear translation in the direction indicated by arrow 372, ramps 254 move across ramps 252 to drive the associated individual key 324 downwards in the direction indicated by arrow 374 to the retracted state. As noted above, in some implementations, ramps 252, projections 253 and ramps 254 may be located relative to one another configured to provide a dwell such that inter-engagement between ramps 252, projections 253 and ramps 254 is delayed until display panel 326 has been pivoted or rotated to within a predetermined angular spacing from deck 322. When display panel 324 is pivoted upward to a raised or deployed position, the above described operations are reversed such that frame 342 is moved back to the releasing position shown in FIGS. 11 and 13 and such that ramps 254 are withdrawn out of engagement with ramps 252, projections 253. As a result, each of keys 324 is once again resiliently returned to its default raised state.

FIGS. 15-19 illustrate electronic device 420 another example implementation of electronic device 20. Electronic device 420 is similar to electronic device 320 except that electronic device comprises retraction drive 428 in place of retraction drive 328. Those remaining elements of electronic device 420 which correspond to components of electronic device 320 are numbered similarly.

Retraction drive 428 comprises rack gear 460 and helical or worm gear 462. Rack gear 460 comprises a plurality of teeth 466 extending from end bar 348 of retraction frame 342, wherein teeth 466 receive threads 468 of worm gear 462. Although illustrated as extending along a side of rack gear 460, teeth 466 may alternatively extend along a top face or a bottom face of end bar 348. In yet other implementations, rack gear 460 may be replaced with a round or flat worm gear having curved teeth such that rotation of worm gear 462 about axis 470 linearly translates retraction frame 342 along axis 470.

Worm gear 462 extends from pivot shaft 336 so as to rotate with pivot shaft 336. The helical threads 468 of worm gear 462 rotate within or between teeth 466 to apply force against side edges of teeth 466 to linearly translate retraction frame 342.

Figure 18:
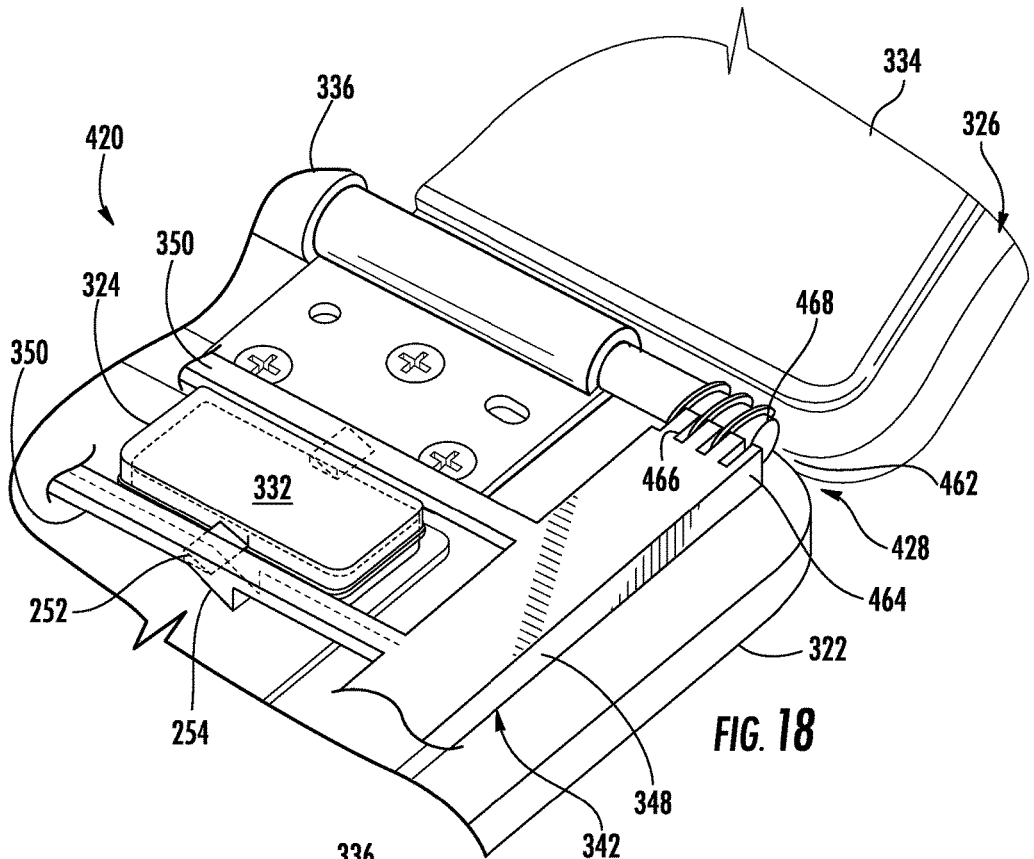
FIG. 18 is a fragmentary perspective view of the electronic device of FIG. 15 with keys in a raised state.
Figure 19:
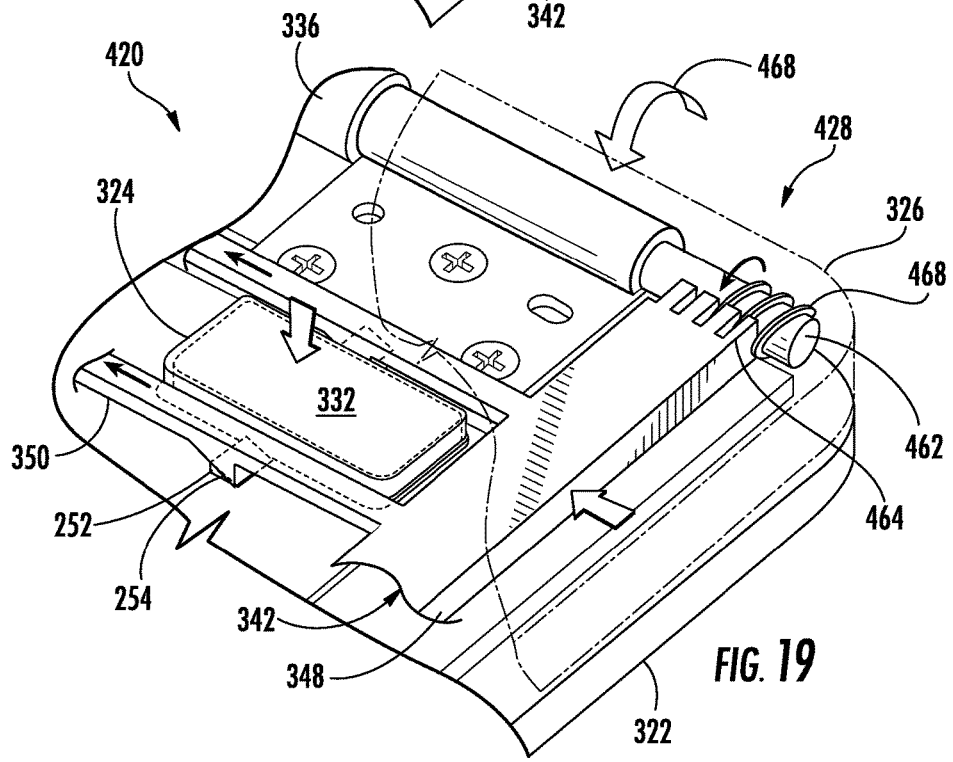
FIG. 19 is a fragmentary perspective view of the electronic device of FIG. 15 with keys in a retracted state.

FIGS. 16-19 illustrate retraction of keys by retraction mechanism 428. FIGS. 16 and 18 illustrate retraction frame 342 in the releasing position while FIGS. 17 and 19 illustrate retraction frame 342 in the retracting position. As shown by FIGS. 16 and 18, when in the releasing position, thread 468 resides within teeth 466 and ramps 254 are out of engagement with ramps 252 of each of the keys 324. As a result, each of the keys 324 is resiliently biased to the raised state in which the top surface 332 of each key rises above or is located above the top surface 330 of deck 322.

As shown by FIGS. 17 and 19, pivoting of display panel 326 (shown in phantom and partially broken away) to the closed position as indicated by arrow 469 rotates the hinge shaft 336 which also results in rotation of worm screw 462 in the direction indicated by arrow 471. Rotation of worm screw 462 results in linear translation of end bar 348 and retraction frame 342 in the direction indicated by arrows 472. As shown by FIG. 19, during such linear translation in the direction indicated by arrow 472, ramps 254 move across ramps 252 (and projections 253) to drive the associated individual key 324 downwards in the direction indicated by arrow 474 to the retracted state. As noted above, in some implementations, ramps 252, projections 253 and ramps 254 may be located relative to one another configured to provide a dwell such that inter-engagement between ramps 252, projections 253 and ramps 254 is delayed until display panel 326 has been pivoted or rotated to within a predetermined angular spacing from deck 322. When display panel 324 is pivoted upward to a raised or deployed position, the above described operation is reversed such that frame 342 is moved back to the releasing position shown in FIGS. 16 and 18 such that ramps 254 are withdrawn out of engagement with ramps 252, projections 253. As a result, each of keys 324 is once again resiliently returned to its default raised state.

FIGS. 20-26 illustrate electronic device 520, another example implementation of electronic device 20. Electronic device 520 is similar to electronic device 320 except that electronic device comprises retraction drive 528 in place of retraction drive 328. Those remaining elements of electronic device 520 which correspond to components of electronic device 320 are numbered similarly.

Retraction drive 528 comprises cam follower 560 and cam 562. Cam follower 560 comprises one or more surfaces configured to ride against cam 562 as cam 562 is rotated about axis 570 so as to linearly translate retraction frame 342 in a direction parallel to axis 570. Cam 562 comprises a structure surface operably coupled to pivot shaft 336 so as to rotate with the rotation of pivot shaft 336 while in engagement with cam follower 560. In the example illustrated, cam follower 560 comprises a helical slot, groove or passage while cam 552 comprises a projection or pin radially extending from an end portion of pivot shaft 336 and received within the slot of cam follower 560. In other implementations, cam follower 560 may alternatively comprise a planar projection received within a helical slot forming cam 562 and rotating with pivot shaft 336. In yet other implementations, cam follower 560 and cam 562 may comprise other mechanical camming arrangements that result in linear translation of retraction frame 342 along axis 570 as pivot shaft 336 rotates about axis 570.

Figure 23:
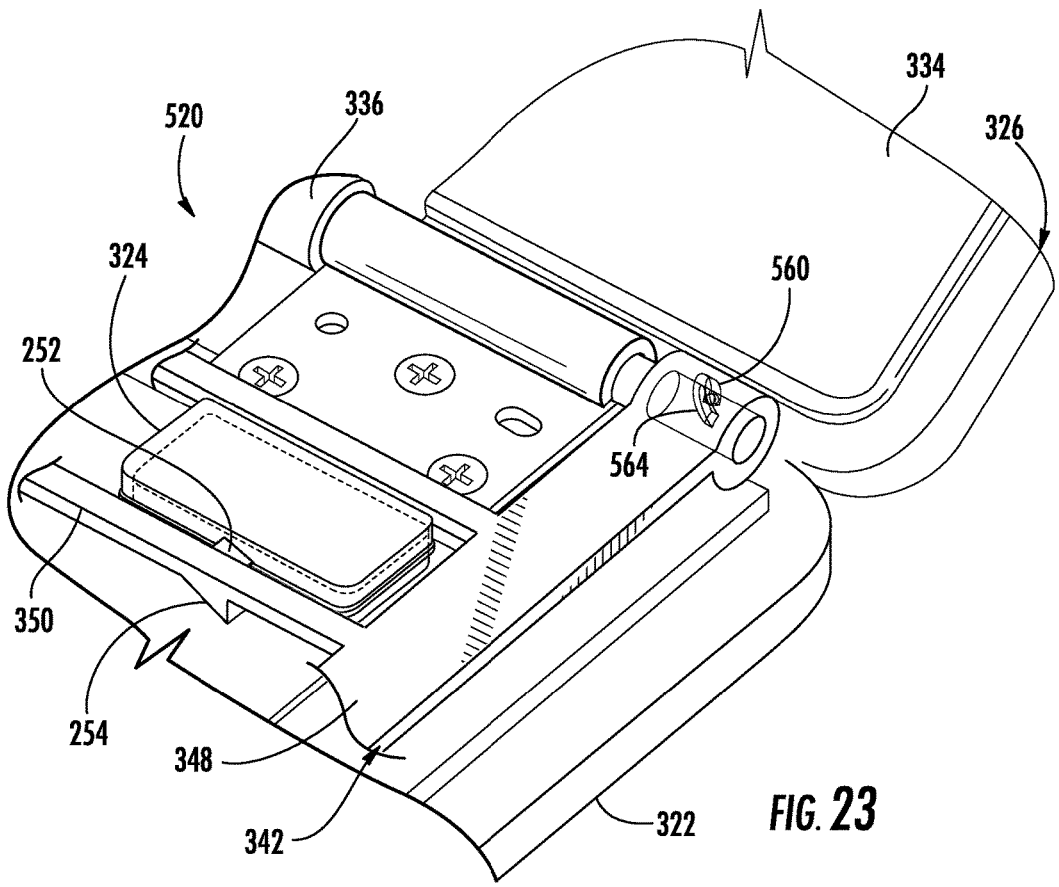
FIG. 23 is a fragmentary perspective view of the electronic device of FIG. 20 with keys in a raised state.
Figure 24:
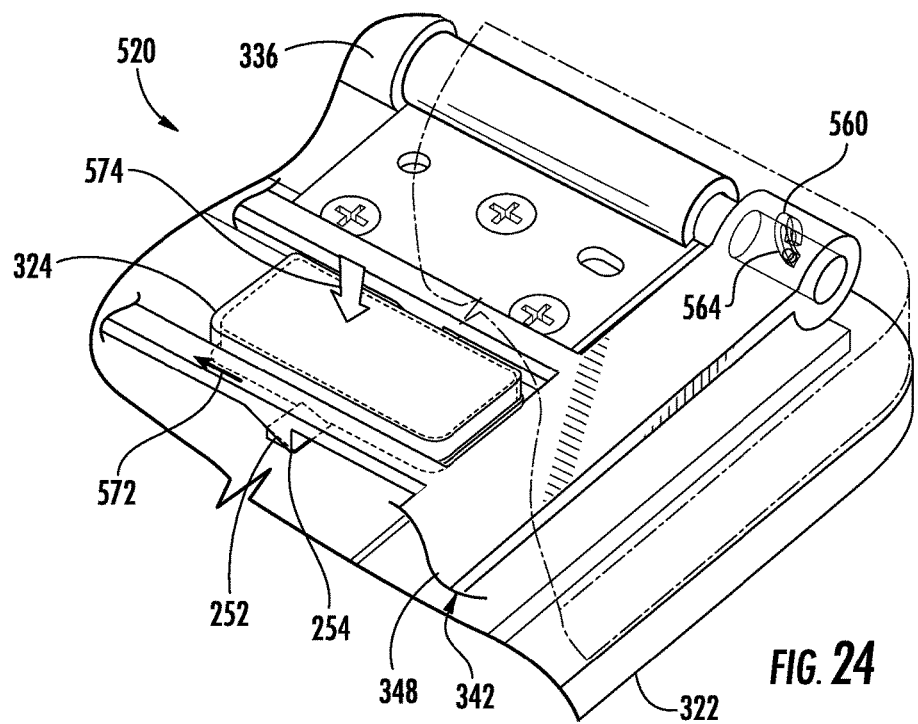
FIG. 24 is a fragmentary perspective view of the electronic device of FIG. 20 with keys in a retracted state.
Figure 25:
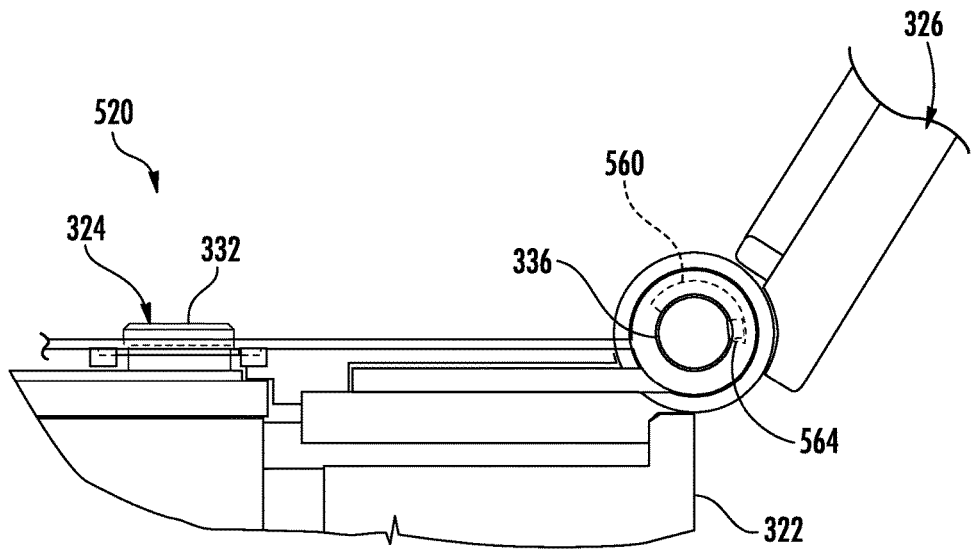
FIG. 25 is a fragmentary side view of the electronic device of FIG. 20 with keys in the raised state.
Figure 26:
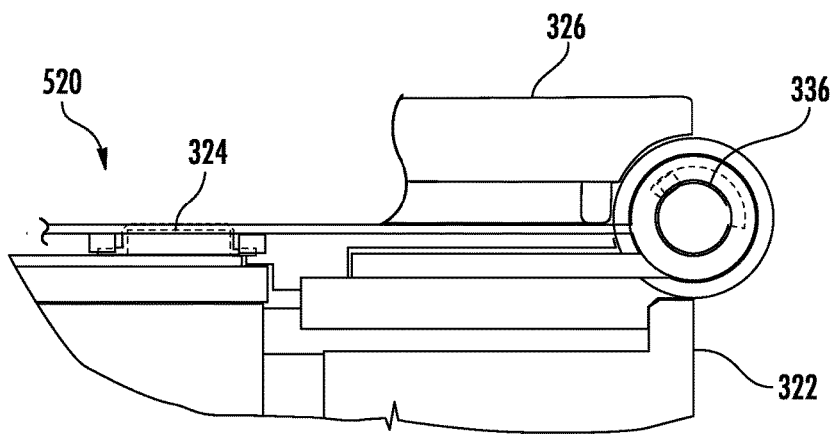
FIG. 26 is a fragmentary side view of the electronic device of FIG. 20 with keys in the retracted state.

FIGS. 23-26 illustrate retraction of keys 324 by retraction mechanism 528. FIGS. 23 and 25 illustrate retraction frame 342 in the releasing position while FIGS. 24 and 26 illustrate retraction frame 342 in the retracting position. As shown by FIGS. 23 and 25, when in the releasing position, cam 560 resides in or against a first portion of cam follower 562 such that ramps 254 are out of engagement with ramps 252, projections 253 of each of the keys 324. As a result, each of the keys 324 is resiliently biased to the raised state in which the top surface 332 of each key rises above or is located above the top surface 330 of deck 322.

As shown by FIGS. 24 and 26, pivoting of display panel 326 (shown in phantom and partially broken away) to the dosed position rotates the hinge shaft 336 which also results in rotation of cam 560. Rotation of cam 560 against cam follower 562 during pivoting of display panel 342 towards deck 322 results in linear translation of end bar 348 and retraction frame 342 in the direction indicated by arrows 572 (shown in FIG. 24). As further shown by FIG. 24, during such linear translation in the direction indicated by arrow 572, ramps 254 move across ramps 252 (and projections 253) to drive the associated individual key 324 downwards in the direction indicated by arrow 574 to the retracted state.

As noted above, in some implementations, ramps 252, projections 253 and ramps 254 may be located relative to one another configured to provide a dwell such that inter-engagement between ramps 252, projections 253 and ramps 254 is delayed until display panel 326 has been pivoted or rotated to within a predetermined angular spacing from deck 322. In the example illustrated, cam 516 cam follower 562 are configured to provide a dwell such that inter-engagement between ramps 252, projections 253 and ramps 254 is delayed until display panel 326 has been pivoted or rotated to within a predetermined angular spacing from deck 322. In the particular example, the slot forming cam follower 562 has a portion which allows rotation of cam 560 without corresponding linear translation of retraction frame 342. When display panel 324 is pivoted upward to a raised or deployed position, the above described operation is reversed such that frame 342 is moved back to the releasing position shown in FIGS. 23 and 25 such that ramps 254 are withdrawn out of engagement with ramps 252, projections 253. As a result, each of keys 324 is once again resiliently returned to its default raised state.

Figure 27:
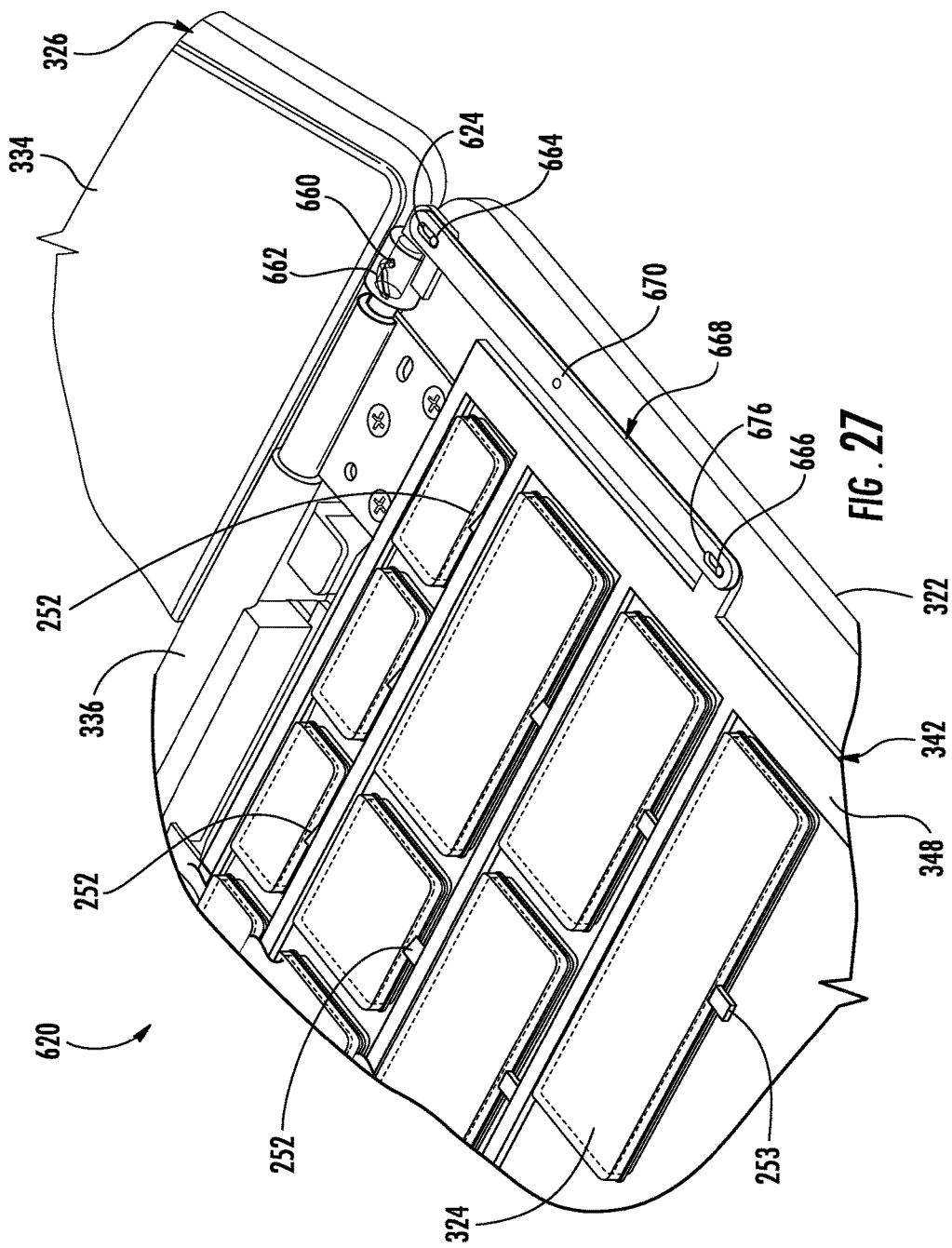
FIG. 27 is a fragmentary perspective view of another example of the electronic device of FIG. 9 with keys in a raised state.
Figure 28:
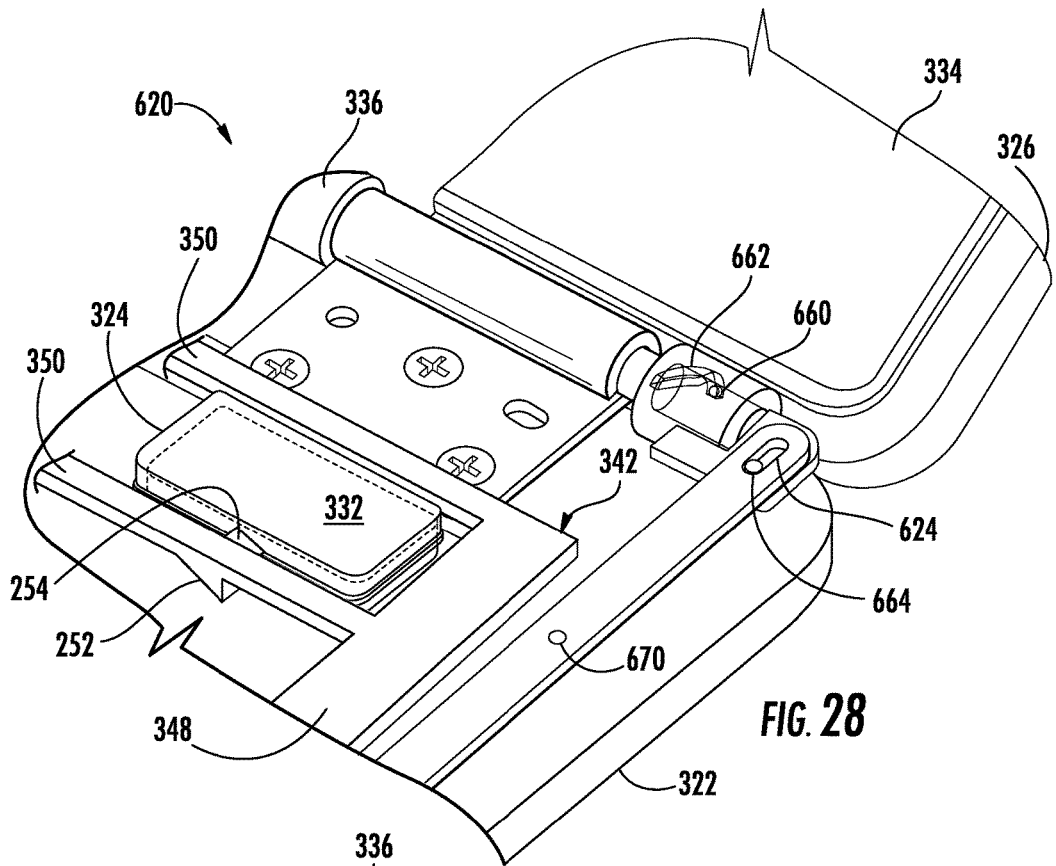
FIG. 28 is an enlarged fragmentary perspective view of the electronic device of FIG. 27 with the keys in the raised state.
Figure 29:
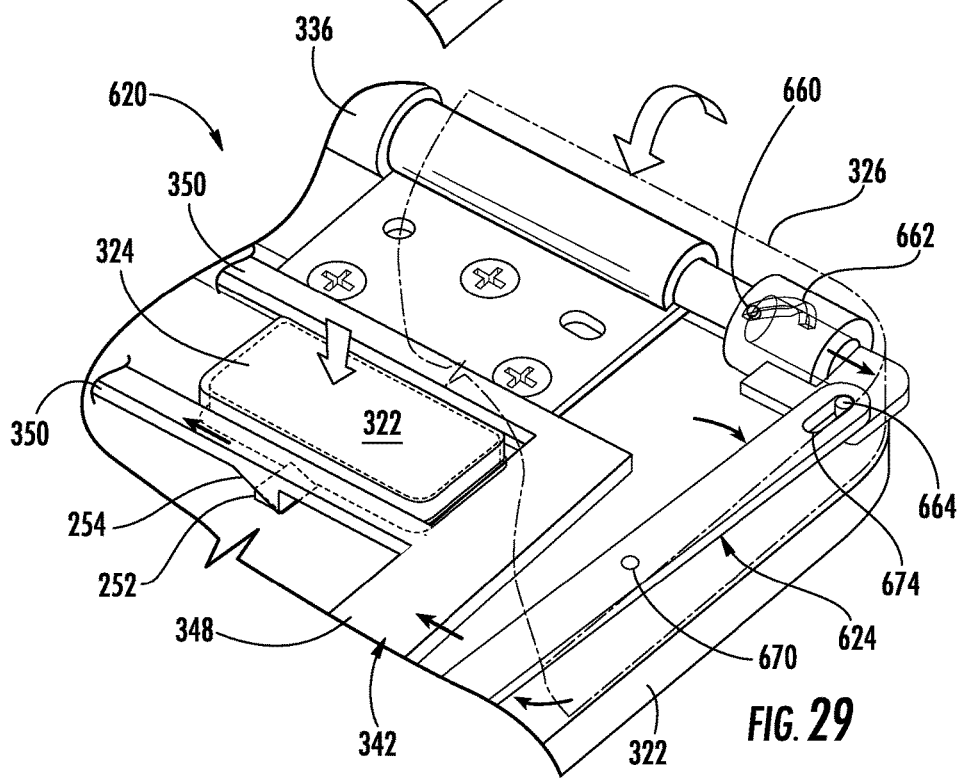
FIG. 29 is an enlarged fragmentary perspective view of the electronic device of FIG. 27 with the keys in a retracted state.

FIGS. 27-29 illustrate electronic device 620, another example implementation of electronic device 20. Electronic device 620 is similar to electronic device 520 except that electronic device comprises retraction drive 628 in place of retraction drive 528. Those remaining elements of electronic device 620 which correspond to components of electronic device 520 are numbered similarly.

Retraction drive 628 is similar to retraction drive 528 except that retraction drive 628 comprises cam 660, cam follower 662, coupling pins 664, 666 and linkage 668. Cam 660 and cam follower 662 are similar to cam 560 and cam follower 562, respectively, except that cam 660 and cam follower 662 are configured such that cam follower 662 is linearly translated outwardly (to the right as seen in FIG. 27) as display panel 326 is being pivoted downward towards deck 322. In one implementation, similar to cam follower 562, cam follower 662 provides a dwell such cam follower 662 does not linearly translate in our direction until display panel 326 has been rotated to within a predetermined angular position with respect to deck 322.

Coupling pin 664 comprise a pin or other projection carried by cam follower 662 so as to linearly translate with cam follower 662 as cam 660 moves against cam follower 662 during pivoting of display panel 326. Coupling pin 666 comprises a pin or other projection extending from retraction frame 342. In the example illustrated, coupling pin 666 extends from retraction frame 342 at a longitudinal midpoint of retraction frame 342.

Linkage 668 comprises one or more linkages operably coupling cam follower 662 and retraction frame 342. In the example illustrated, linkage 668 comprises a single linkage rotationally or pivotally connected to deck 322 for rotation about pivot axis 670. Linkage 668 comprises coupling slots 474, 676. Coupling slot 674 extends at a first end portion of linkage 668 and slidably receives coupling pin 664. Coupling slot 676 is located at a second end portion of linkage 668 and slidably receives coupling pin 666. Coupling slots 674, 676 cooperate with coupling pins 664, 666, respectively, to transmit motion from cam follower 662 to retraction frame 342. In other implementations, cam follower 662 and retraction frame 342 alternatively comprise coupling slots while linkage 668 comprises coupling pins.

FIGS. 28 and 29 illustrate retraction of keys 324 by retraction mechanism 628. FIG. 28 illustrate retraction frame 342 in the releasing position while FIG. 29 illustrates retraction frame 342 in the retracting position. As shown by FIG. 28, when in the releasing position, cam 660 resides in or against a first portion of cam follower 662 such that ramps 254 are out of engagement with ramps 252, projection 253 of each of the keys 324. As a result, each of the keys 324 is resiliently biased to the raised state in which the top suffice 332 of each key rises above or is located above the top surface 330 of deck 322.

As shown by FIG. 29, pivoting of display panel 326 (shown in phantom and partially broken away) to the closed position rotates the hinge shaft 336 which also results in rotation of cam 660. Rotation of cam 660 against cam follower 662 during pivoting of display panel 342 towards deck 322 results in linear translation of cam follower 662. Linear translation of cam follower 662 rotates linkage 628 about pivot axis 670 to linearly translate retraction frame 342 in the direction indicated by arrows 672. During such linear translation in the direction indicated by arrow 672, ramps 254 move across ramps 252 (and projections 253) to drive the associated individual key 324 downwards in the direction indicated by arrow 674 to the retracted state. As noted above, in some implementations, ramps 252, projections 253 and ramps 254 may be located relative to one another configured to provide a dwell such that inter-engagement between ramps 252, projections 253 and ramps 254 is delayed until display panel 326 has been pivoted or rotated to within a predetermined angular spacing from deck 322. In the example illustrated, cam 660 and cam follower 562 are configured to provide a dwell such that inter-engagement between ramps 252, projections 253 and ramps 254 is delayed until display panel 326 has been pivoted or rotated to within a predetermined angular spacing from deck 322. In the particular example, the slot forming cam follower 662 has a portion which allows rotation of cam 660 without corresponding linear translation of retraction frame 342. When display panel 324 is pivoted upward to a raised or deployed position, the above described operation is reversed such that frame 342 is moved back to the releasing position shown in FIG. 28 such that ramps 254 are withdrawn out of engagement with ramps 252, projections 253. As a result, each of keys 324 is once again resiliently returned to its default raised state.

Although retraction mechanism 628 is illustrated and described as utilizing cam 660 and cam follower 662 to linearly translate cam follower 662 outward (to the right as seen in FIG. 29) in response to pivoting of display panel 324 towards the closed position so as to move retraction frame 342 inward in the direction indicated barrel 672 to move keys 324 towards the retracted state, in other implementations, the configurations of cam 660, cam follower 662 and ramps 252, projected 253 and ramps 254 may be reversed such that cam 660 and cam follower 662 linearly translate cam follower 662 inward in response to pivoting of display panel 324 towards the closed position so as to move retraction frame 342 outward in the direction indicated arrow 672 so as to move each of keys 324 towards the retracted state. For example, cam follower 62 may be configured such that cam follower 62 moves to the left (as seen in FIG. 29) during downward pivoting of display panel 324 towards the closed position. Instead of facing to the left as shown in FIG. 29, ramps 254 may alternatively face to the right.

Although linkage 628 and coupling pins 664, 666 are illustrated and described, as being utilized with cam 660 and cam follower 662 as part of retraction mechanism 628, linkage 628 and coupling pin 664, 666 may also be provided as part of any of the above described retraction mechanisms. Due to the directional change of motion provided by the pivoting of linkage 628, the addition of linkage 628 to the above-described retraction mechanisms 328 and 428 may also invoke reversing the direction in which ramps 252, 250 face or may alternatively configuring nut 360 and screw 362 or worm gear 462 and rack gear 464 such that pivoting of display panel 324 towards the closed position alternatively moves nut 360 or rack gear 464 in an opposite direction to that described above. In each of the implementations described, the configuration of the particular retraction drive and the direction in which retraction frame 342 is linearly translated may be varied depending upon the direction of ramps 254.

FIGS. 30-33 illustrate electronic device 720, another example implementation of electronic device 20. Electronic device 720 is similar to electronic device 20 except that electronic device comprises retraction drive 728 in place of retraction drive 28. Those remaining elements of electronic device 720 which correspond to components of electronic device 20 are numbered similarly.

Retraction drive 728 comprises capstan 760, line 762, motion redirector 768 and bias 770. Capstan 760 comprises a structure extending from pivot shaft 336 so as to rotate with the rotation of pivot shaft 336. Capstan 760 has an outer surface 772 against and about which line 762 winds or wraps during rotation of the shaft 336 and pivoting of display panel 324 about axis 773.

Line 762 comprises an elongate flexible member having a first end portion 775 secured to capstan 760 and a second end portion 777 pivotably pinned to motion redirector 768 at pivot connection 773. Line 762 is sufficiently flexible so as to wrap about capstan 760 during rotation of capstan 760. In the example illustrated, line 762 comprises a strap or belt. In other implementations, line 762 may comprise a cable, wire, chain or toothed belt.

Motion redirector 768 is coupled between line 728 and retraction frame 342. Motion redirector 768 alters or changes the direction of motion of line 762 perpendicular to axis 773 by 90 degrees to linearly translate retraction frame 342 in a transverse direction parallel to axis 773. In the example illustrated, motion redirector 768 comprises coupling pin 780 and linkage 782. Coupling pin 780 comprises a pin or other projection extending from retraction frame 342. Linkage 782 is pivotally coupled to deck 322 for rotation about pivot axis 784 and comprises coupling slot 786. Coupling slot 786 slidably receives coupling pin 780 on an opposite side of pivot axis 784 as pivot connection 773.

Bias 770 resiliently biases line 762 in an unwinding direction with respect to capstan 773 to maintain line 762 in a taught state. By maintaining line 762 in a taught state, variability in the movement of retraction frame 342 in response to pivoting of display panel 324 is reduced. In the example illustrated, biased 770 comprises a tension spring having a first end secured to deck 322 and a second end secured to linkage 782. In other implementations, biased 770 alternatively comprise other types of springs such as torsion or compression springs appropriately coupled to line 762 so as to bias line 762 in an unwinding direction.

Figure 30:
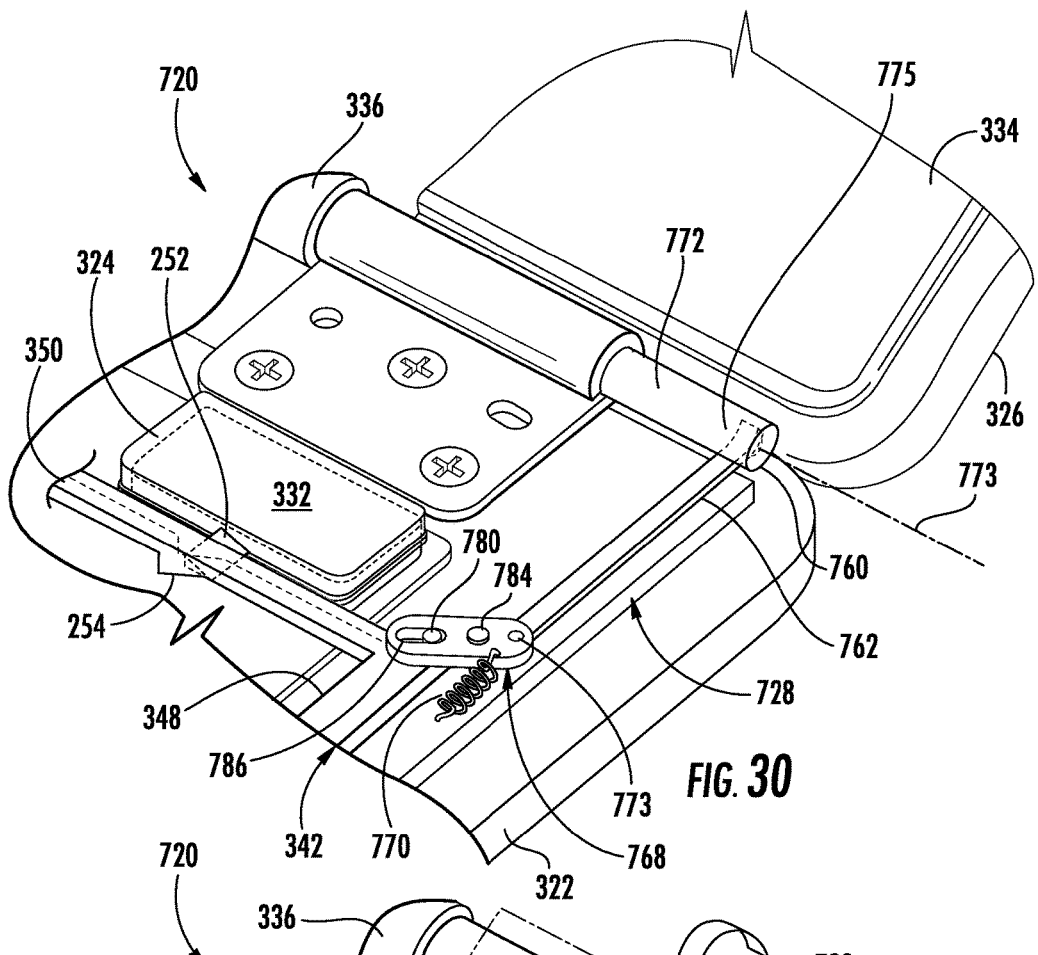
FIG. 30 is an enlarged fragmentary perspective view of another example of the electronic device of FIG. 9 with keys in a raised state.
Figure 31:
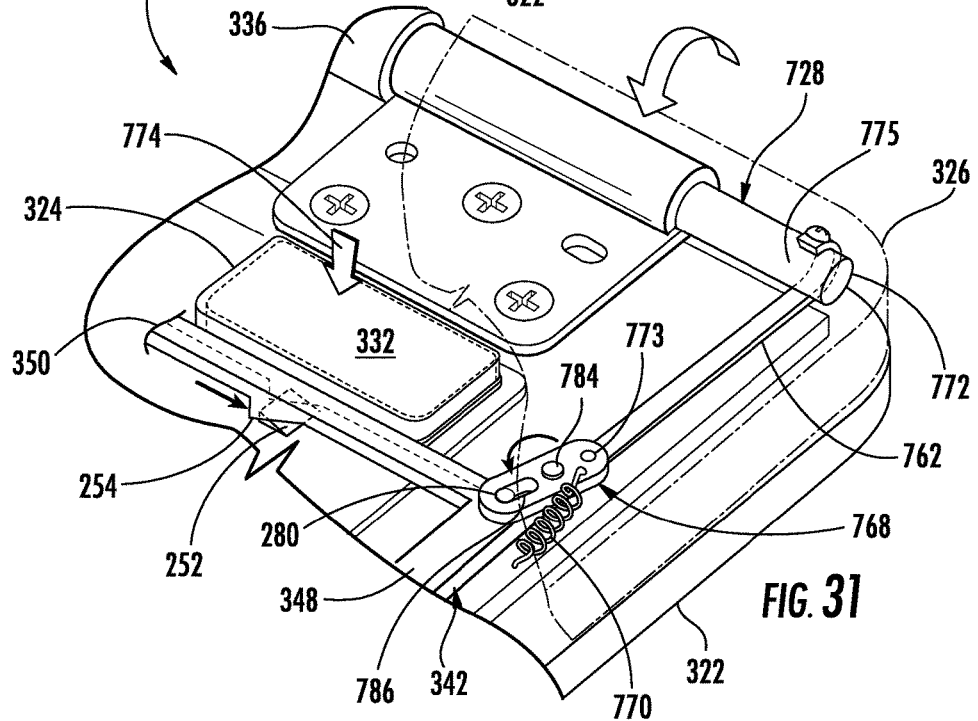
FIG. 31 is an enlarged fragmentary perspective view of the electronic device of FIG. 30 with the keys in a retracted state.
Figure 32:
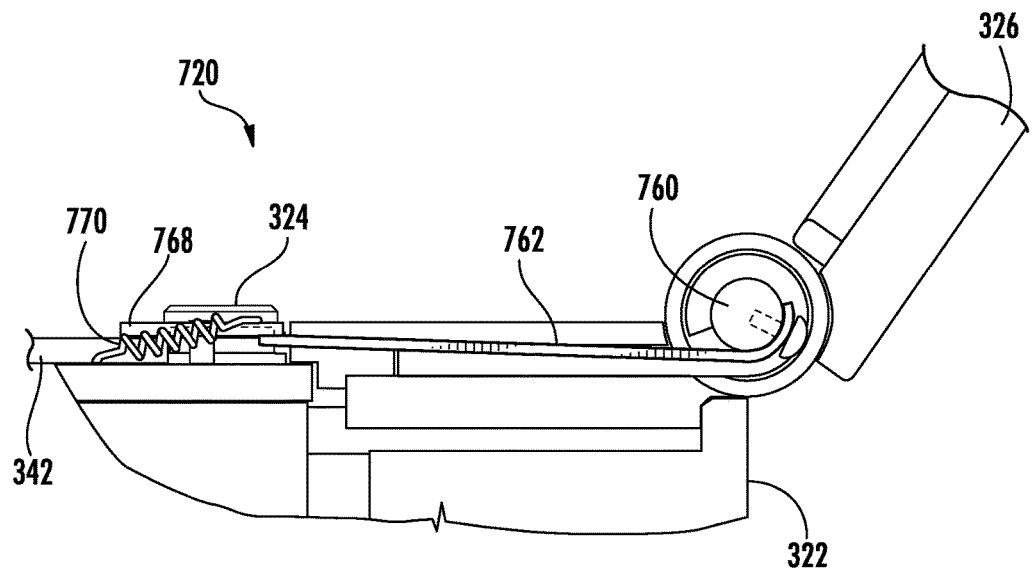
FIG. 32 is an enlarged fragmentary perspective view of the electronic device of FIG. 30 with the keys in the raised state.
Figure 33:
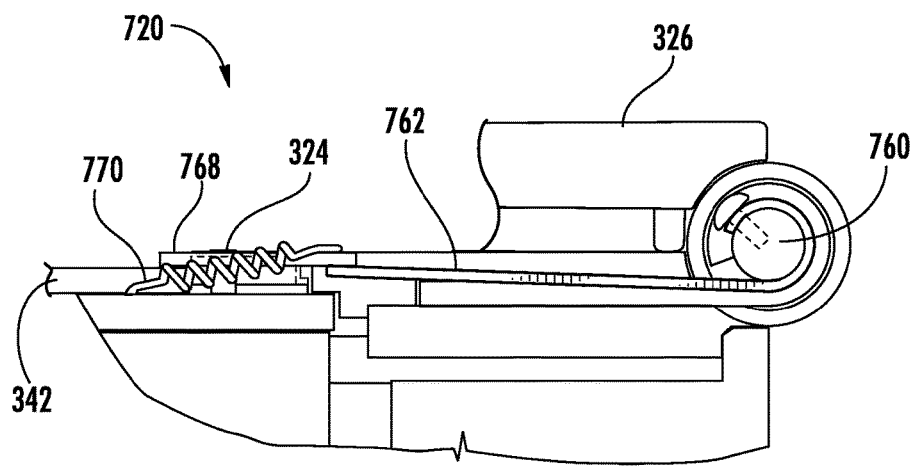
FIG. 33 is an enlarged fragmentary perspective view of the electronic device of FIG. 32 with the keys in a retracted state.
Figure 34:
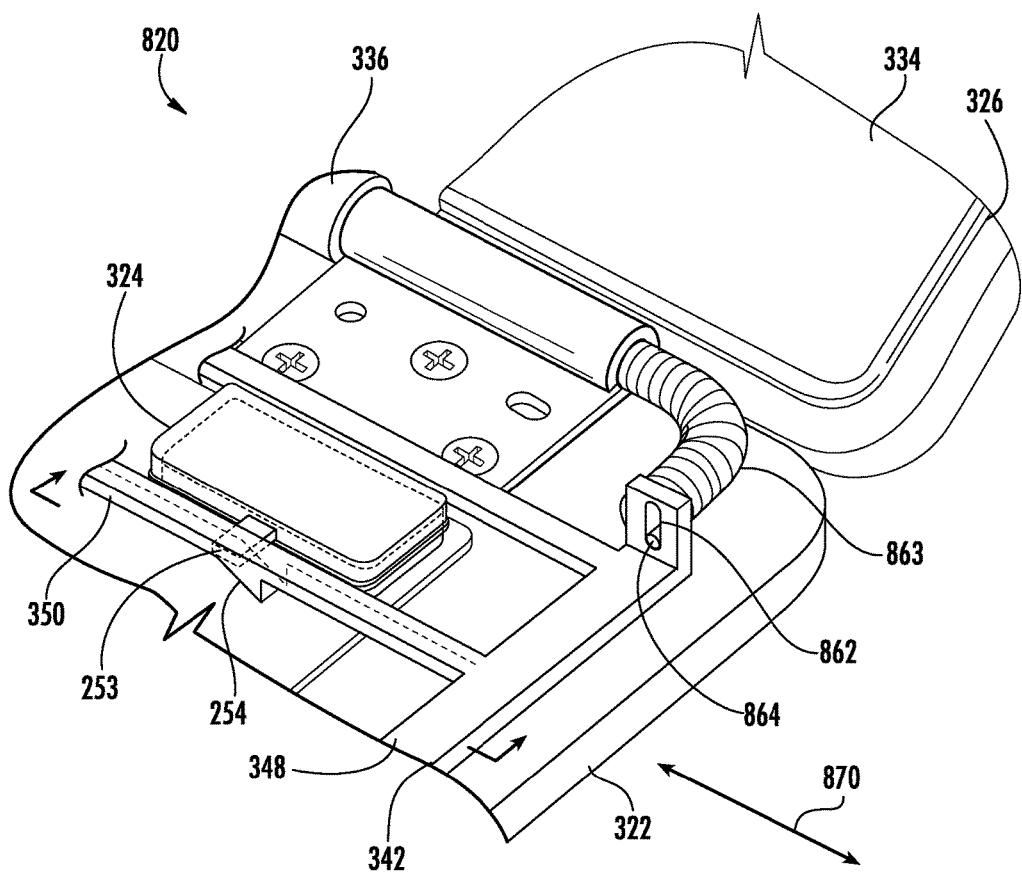
FIG. 34 is an enlarged fragmentary perspective view of another example of the electronic device of FIG. 9 with keys in a raised state.
Figure 35:
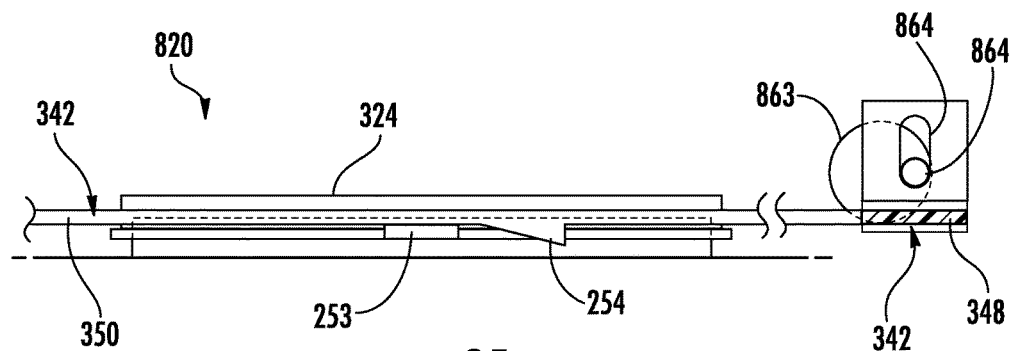
FIGS. 35-37 are side views of the electronic device of FIG. 34 during movement of keys to a retracted state.
Figure 36:
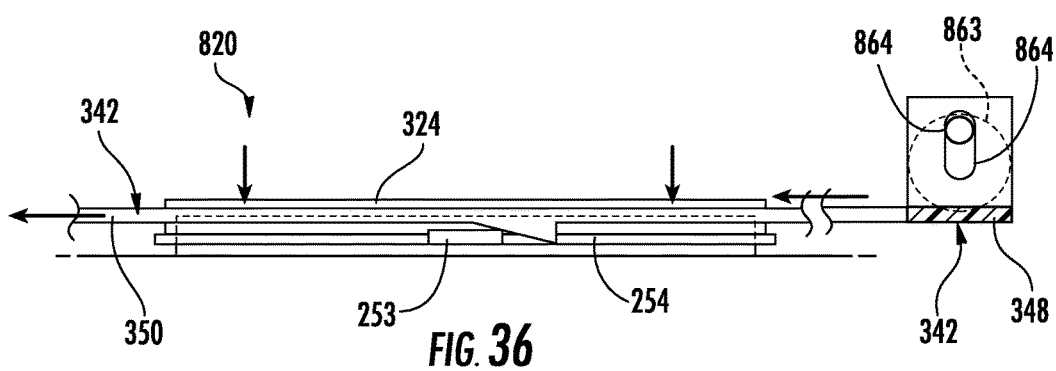
Figure 37:
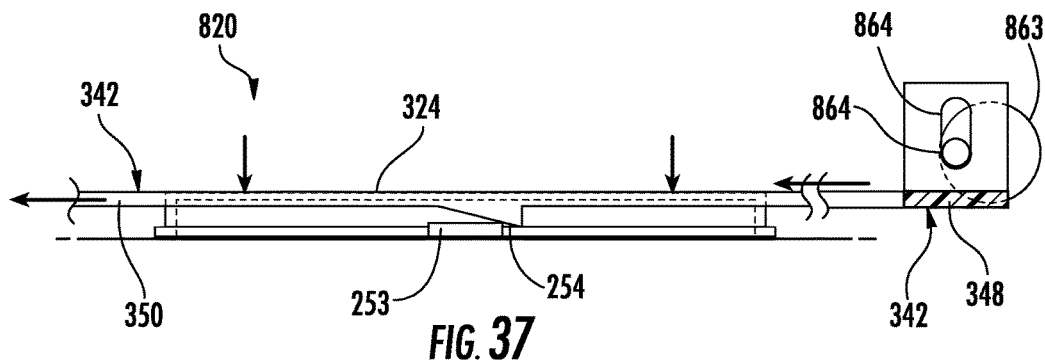

FIG. 30-33 illustrate retraction of keys 324 by retraction mechanism 728. FIGS. 30 and 32 illustrate retraction frame 342 in the releasing position while FIGS. 31 and 33 illustrates retraction frame 342 in the retracting position. As shown by FIGS. 30 and 32, when in the releasing position, line 762 is officially unwound from capstan 760 such that ramps 254 are out of engagement with ramps 252, projection 253 of each of the keys 324. As a result, each of the keys 324 is resiliently biased to the raised state in which the top surface 332 of each key rises above or is located above the top surface 330 of deck 322.

As shown by FIGS. 31 and 33, pivoting of display panel 326 (shown in phantom and partially broken away) to the closed position rotates the hinge shaft 336 which also results in rotation of capstan 660. Rotation of capstan 660 winds line 762 during pivoting of display panel 342 towards deck 322 to pull on line 662 to rotate linkage 782 about pivot axis 784 against bias 770 to linearly translate retraction frame 342 in the direction indicated by arrows 772. During such linear translation in the direction indicated by arrow 772, ramps 254 move across ramps 252 (and projections 253) to drive the associated individual key 324 downwards in the direction indicated by arrow 774 to the retracted state. As noted above, in some implementations, ramps 252, projections 253 and ramps 254 may be located relative to one another configured to provide a dwell such that inter-engagement between ramps 252, projections 253 and ramps 254 is delayed until display panel 326 has been pivoted or rotated to within a predetermined angular spacing from deck 322. When display panel 324 is pivoted upward to a raised or deployed position, the above described operation is reversed such that frame 342 is moved back to the releasing position shown in FIG. 30 such that ramps 254 are withdrawn out of engagement with ramps 252, projections 253. As a result, each of keys 324 is once again resiliently returned to its default raised state.

FIG. 34-37 illustrate electronic device 820, another example implementation of electronic device 20. Electronic device 820 is similar to electronic device 20 except that electronic device 820 comprises retraction drive 828 in place of retraction drive 28. In addition, FIG. 34-37 illustrate ramp 254 selectively engaging a projection 253 instead of a ramp 252. Those remaining elements of electronic device 820 which correspond to components of electronic device 20 are numbered similarly.

Retraction drive 828 is similar to retraction drive 28 except that retraction drive 828 comprises cam follower 862, cable 863 and cam 864. Cam follower 862 comprises an elongate slot carried by retraction frame 342 which slidably receives cam 864. Cam follower 862 is configured such that rotation of cam 864 linearly translates retraction frame 342 in directions indicated by arrows 870.

Cable 863 comprises an elongate flexible but untwistable member operably coupled between display panel 326 and refraction for frame 342. Cable 863 is coupled to pivot shaft 336 so as to rotate with the rotation of pivot shaft 336 and in response to pivoting of display panel 326. In one implementation, cable 863 may comprise a cable movably received within and guided by an outer housing or sleeve. Cable 860 transmits torque and motion to cam 864.

Cam 864 comprises a pin or other projection eccentrically extending from an axial end of cable 863 and received within the slot of cam follower 862. As shown by FIGS. 34-37, pivoting of display panel 326 rotates pivot shaft 336 which rotates cable 863. Rotation of cable 863 rotates eccentrically extending cam 864 which interacts with the inner surfaces of cam follower 862 to linearly translate retraction frame 342. During pivoting of display panel 326 towards the closed position, retraction frame 342 is linearly translated such that ramps 254 are brought into engagement with projections 253 (and ramps 252) to move the associated keys 324 to the retracted states. Opening of display panel 326 rotates hinge shaft 336 in a reverse direction which ultimately results in retraction frame 342 being returned to the releasing position shown in FIG. 34 and 35 in which key 324 is resiliently returned to its raised state. In some implementations, the slot of cam follower 862 may be configured to provide a dwell such that linear translation of retraction frame 342 is initiated after display panel 326 has been pivoted to within a predetermined angular spacing from deck 322. Although illustrated as a slot and pin arrangement, cam follower 862 and cam 864 may alternatively comprise other camming arrangements.

Figure 38:
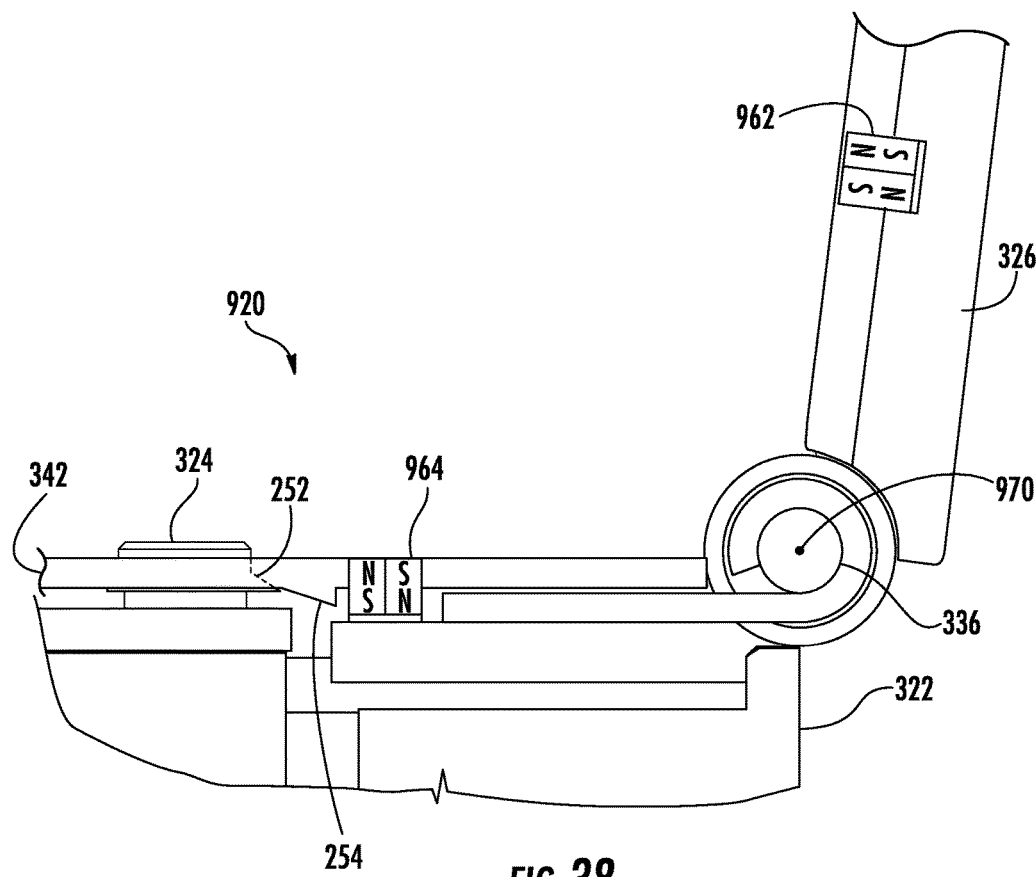
FIG. 38 is a side view of another example of the electronic device of FIG. 1 having a display panel in a deployed position and keys in a raised state.
Figure 39:
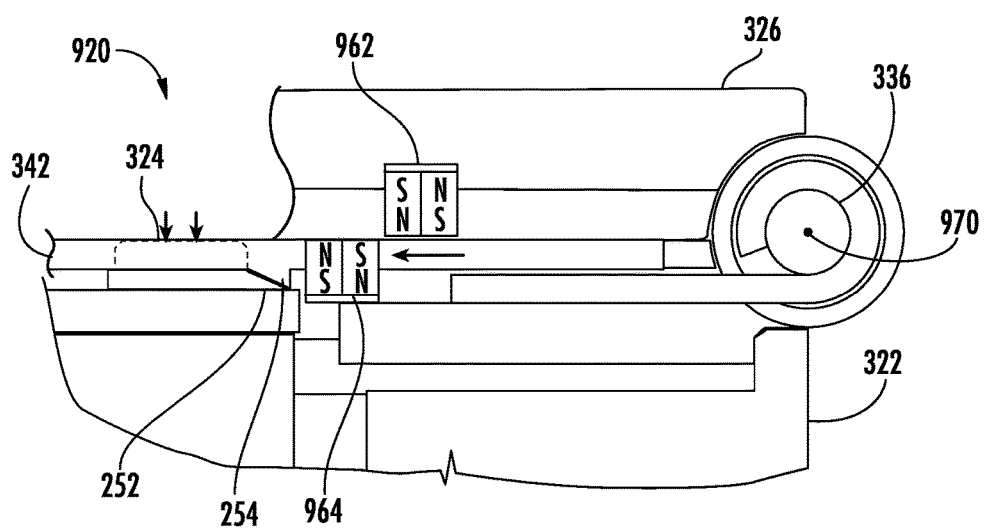
FIG. 39 is a side view of the electronic device of FIG. 38 with the display panel in a closed position and keys in a retracted state.

FIGS. 38 and 39 illustrate electronic device 920, another example implementation of electronic device 20. Electronic device 920 is similar to electronic device 20 except that electronic device 920 comprises retraction drive 928 in place of retraction drive 28. Those remaining elements of electronic device 820 which correspond to components of electronic device 20 are numbered similarly.

Retraction drive 928 comprises magnets 962 and 964. Magnet 962 comprises a magnet carried by display panel 326. Magnet 962 has sufficient magnetic strength and is located so as to interact with magnet 964 as display panel 326 is being pivoted towards deck 322 and lowered to the dosed position shown in FIG. 39 prior to contact between display panel 326 and keys 324. Magnet 964 comprises a magnet carried by retraction frame 342. As shown by FIG. 39, during pivoting of display panel 326 towards the closed position, magnet 962 repels magnet 964 to horizontally and linearly translate retraction frame 342 to move ramps 254 against ramps 252 and projections 253 to drive keys 324 to the retracted states.

In the example illustrated, retraction frame 342 is linearly translated in a longitudinal direction perpendicular to the pivot axis 970 of pivot shaft 336. Ramps 254 are arranged to face a front edge of deck 322 opposite to ramps 252 which extend from transverse sides of keys 324 and face towards a rear of deck 322. In other implementations, ramps 252 and ramps 254 may alternatively be oriented in transverse directions as shown in FIG. 10, wherein a motion redirector is operably coupled between magnet 964 and retraction frame 342 to redirect longitudinal motion of magnet 964 in the direction indicated by arrow 974 to a transverse direction parallel to axis 970. One example of such a motion redirector is motion redirector 768 excluding bias 770. In yet another implementation, in lieu of magnet 962 repelling magnet 964 to linearly translate retraction frame 342, magnet 962 may attract magnet 964 to linearly translate retraction frame 342 in response to and as display panel 326 is in the process of being lowered towards deck 322 and towards the closed position.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
    a deck;
    depressable keys supported by the deck and resiliently biased to a raised state;
    a display panel pivotally coupled to the deck for movement between a deployed position and a closed position; and
    a retraction mechanism comprising:
    a retraction frame translatable between a releasing position along the depressable keys to actuate the depressable keys to the raised state and a retracting position moving to move the depressable keys to the retracted state; and
    a retraction drive operably coupled between the display panel and the retraction frame to translate the retraction frame towards the retracting position in response to pivoting of the display panel towards the closed position, wherein the retraction drive is configured to provide a dwell, delaying movement of the retraction frame towards the retracting position until the display panel has been pivoted to a predetermined angular position with respect to the deck.

2. The apparatus of claim 1, wherein the retraction frame is translatable along a transverse axis parallel to a top edge of the display panel between the releasing position and the retracting position.

3. The apparatus of claim 1, when the retraction drive comprises:
    a lead nut carried by one of the retraction frame in the display panel; and
    a lead screw received by the lead nut carried by the other of the retraction frame and the display panel such that pivoting of the display panel translates the retraction frame between the releasing position and the retracting position.

4. The apparatus of claim 1, wherein the retraction drive comprises:
    a flat worm gear carried by the retraction frame; and
    a worm gear coupled to the display panel while in engagement with the flat worm gear such that pivoting of the display panel translates the retraction frame between the releasing position and the retracting position.

5. The apparatus of claim 1, wherein the retraction drive comprises
    a cam carried by one of the retraction frame and the display panel; and
    a cam follower carried by the other of the retraction frame and the display panel while in engagement with the cam such that pivoting of the display panel translates the retraction frame between the releasing position and the retracting position.

6. The apparatus of claim 5, wherein the cam follower comprises a cam slot receiving the cam.

7. The apparatus of claim 5 further comprising a lever pivotally coupled to the deck, a lever having a first end portion pivotally coupled to the cam follower and a second end portion pivotally coupled to the retraction frame.

8. The apparatus of claim 1, wherein the retraction drive comprises:
    a capstan operably coupled to one of the display panel and the retraction frame; and
    a line having a first portion coupled to the capstan to wrap about the capstan in response to pivoting of the display panel and a second portion coupled to the other of the display panel and the retraction frame.

9. The apparatus of claim 1, wherein the retraction drive comprises:
    a cable operably coupled to the display panel to rotate with pivoting of the display panel;
    a cam coupled to the cable to rotate with the cable; and a cam follower coupled to the retraction frame and in contact with the cam such that rotation of the cam interacts with the cam follower to translate the retraction frame between the releasing position and the retracting position.

10. The apparatus of claim 1, wherein the retraction frame translates between the releasing position and the retracting position along an axis parallel to a pivot axis of the display panel.

11. An apparatus comprising:
a deck;
keys supported by the deck and resiliently biased to a raised state, the keys coupled to one of a ramp and a ramp rider;
a display panel pivotally coupled to the deck for movement between a deployed position and a closed position; and
a retraction mechanism operably coupled to the display panel to move the keys towards a retracted state in response to pivoting of the display panel towards the closed position, the retraction mechanism comprising:
a retraction frame coupled to the other of the ramp and the ramp rider, the retraction frame being translatable between a releasing position along the keys in which the ramp rider is positioned with respect to the ramp to permit the keys to rise to the raised state and a retracting position in which the ramp and the ramp rider contact one another to move the keys to the retracted state; and
a retraction drive operably coupled between the display panel and the retraction frame to translate the retraction frame towards the retracting position in response to pivoting of the display panel towards the closed position.

12. A notebook computer comprising:
a deck;
depressable keys supported by the deck;
a display panel pivotable relative to the deck to produce torque; and
a retraction mechanism to utilize the torque produced by pivoting of the display panel to move the keys towards a retracted state with respect to the deck prior to contact between the display panel and the keys;
a ramp coupled to one of the depressable keys and the retraction mechanism; and
a ramp rider coupled to the other of the depressable keys and the retraction mechanism.

13. The notebook computer of claim 12, wherein the retraction mechanism is translatable along a transverse axis parallel to a top edge of the display panel.

14. The notebook computer of claim 12, wherein the retraction mechanism translates towards the retracted state along an axis parallel to a pivot axis of the display panel.

15. The apparatus of claim 12, wherein the ramp and the ramp rider are located to provide a dwell, delaying movement of the keys towards the retracted state until the display pan& has been pivoted to a predetermined angular position with respect to the deck.

* * * * *

UNITED STATES PATENT AND TRADEMARK OFFICE
CERTIFICATE OF CORRECTION

PATENT NO. : 9,632,530 B2  
APPLICATION NO. : 14/893947  
DATED : April 25, 2017  
INVENTOR(S) : Steven K. Jacobs Page 1 of 1

It is certified that error appears in the above-identified patent and that said Letters Patent is hereby corrected as shown below:

In the Claims

In Column 18, Line 28 approx., in Claim 15, delete "pan&" and insert -- panel --, therefor.

Signed and Sealed this  
First Day of August, 2017

Joseph Matal  
*Performing the Functions and Duties of the*  
*Under Secretary of Commerce for Intellectual Property and*  
*Director of the United States Patent and Trademark Office*